(12) United States Patent
Choi

(10) Patent No.: US 11,086,795 B2
(45) Date of Patent: Aug. 10, 2021

(54) MEMORY SYSTEM, MEMORY CONTROLLER AND OPERATING METHOD THEREOF

(71) Applicant: SK hynix Inc., Gyeonggi-do (KR)

(72) Inventor: Hyoung-Pil Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 7 days.

(21) Appl. No.: 16/661,401

(22) Filed: Oct. 23, 2019

(65) Prior Publication Data

US 2020/0310987 A1 Oct. 1, 2020

(30) Foreign Application Priority Data

Apr. 1, 2019 (KR) .......................... 10-2019-0038090

(51) Int. Cl.
*G06F 12/126* (2016.01)
*G06F 12/0873* (2016.01)
*G06F 12/02* (2006.01)
*G06F 13/16* (2006.01)

(52) U.S. Cl.
CPC ........ *G06F 12/126* (2013.01); *G06F 12/0246* (2013.01); *G06F 12/0292* (2013.01); *G06F 12/0873* (2013.01); *G06F 13/1668* (2013.01); *G06F 2212/7201* (2013.01)

(58) Field of Classification Search
CPC .............. G06F 12/126; G06F 12/0873; G06F 12/0246; G06F 13/1668; G06F 12/0292; G06F 2212/7201; G06F 12/1027; G06F 2212/651; G06F 12/1009
See application file for complete search history.

(56) References Cited

U.S. PATENT DOCUMENTS

2019/0034347 A1* 1/2019 Haswell .............. G06F 12/1009
2019/0065400 A1* 2/2019 Shaji Lal ............ G06F 12/1054

FOREIGN PATENT DOCUMENTS

| KR | 10-2009-0098275 | | 9/2009 |
|---|---|---|---|
| KR | 10-2020-0116372 | A | 10/2020 |
| KR | 10-2020-0126491 | A | 11/2020 |

OTHER PUBLICATIONS

Wang et al "Research on the Flash Translation Layer Based on Grouping Pages" [online] Date Added to IEEE Xplore: Dec. 8, 2016. Retrieved from the Internet Dec. 15, 2020 <URL: https://ieeexplore.ieee.org/document/7774749?source=IQplus> (Year: 2016).*

* cited by examiner

*Primary Examiner* — David Yi
*Assistant Examiner* — Dustin B. Fulford
(74) *Attorney, Agent, or Firm* — IP & T Group LLP

(57) ABSTRACT

A memory system, a memory controller and an operating method thereof, capable of reducing the storage capacity of data in relation with map tables, by, in the case where N map entries respectively corresponding to N consecutive physical address regions exist among map entries included in a first map table in a memory device, adding a group map entry indicating a mapping information corresponding to the group of the N number of consecutive physical address regions, to a second map table included in the memory device.

19 Claims, 17 Drawing Sheets

FIG.12
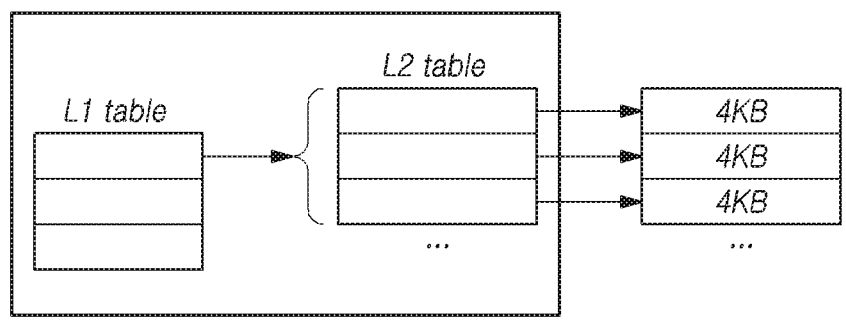
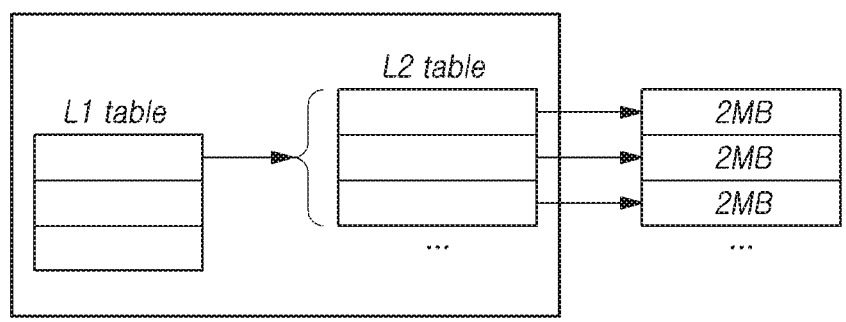

MEMORY SYSTEM, MEMORY CONTROLLER AND OPERATING METHOD THEREOF

CROSS-REFERENCE TO RELATED APPLICATION

The present application claims priority to Korean Patent Application No. 10-2019-0038090 filed in the Korean Intellectual Property Office on Apr. 1, 2019, which is incorporated herein by reference in its entirety.

BACKGROUND

1. Technical Field

Various embodiments generally relate to a memory system, a memory controller and an operating method thereof.

2. Related Art

A memory system corresponding to a storage device stores data based on a request of a host, such as a computer, a mobile device, e.g., a smartphone, a tablet, or any of various electronic devices. The memory system may include not only a device which stores data in a magnetic disk, such as a hard disk drive (HDD), but also a device which stores data in a nonvolatile memory, such as a solid state drive (SDD), a universal flash storage (UFS) device or an embedded MMC (eMMC) device.

The memory system may further include a memory controller for controlling a memory device, and the memory controller may drive firmware for controlling general operations of the memory controller upon booting and performing logic calculations.

The memory system uses map tables to provide a function of converting a logical address provided from the host into a physical address. Further, the memory system caches some of the map tables in a map cache to quickly access a map table.

As the data storage capacity of the memory system increases, the size of the map tables and the size of the map cache also increase. Thus, the cost for managing the map tables and the map cache is continuously increasing.

SUMMARY

Various embodiments are directed to a memory system, a memory controller and an operating method thereof, capable of reducing storage capacity for storing map tables.

Also, various embodiments are directed to a memory system, a memory controller and an operating method thereof, capable of increasing the coverage of an address region by using a single map entry to be cached in a map cache.

Further, various embodiments are directed to a memory system, a memory controller and an operating method thereof, capable of efficiently caching a mapping information between a logical address and a physical address and thereby improving read/program performance.

In one aspect, a memory system to be described in embodiments of the disclosure may include a memory device and a memory controller configured to control the memory device.

The memory device may store a plurality of map tables. The plurality of map tables may include a first map table and a second map table.

Each of the plurality of map tables may include a plurality of map entries which indicate mapping information between one or more logical addresses and one or more physical addresses.

A size of a physical address region corresponding to each of a plurality of map entries in the second map table may be N times a size of a physical address region corresponding to each of a plurality of map entries in the first map table, where N is a natural number of 2 or greater.

In the case where N map entries respectively corresponding to N consecutive physical address regions exist among the map entries in the first map table, the memory controller may add a group map entry indicating mapping information corresponding to a group of the N consecutive physical address regions, to the second map table.

Thereafter, the memory controller may erase the N map entries from the first map table.

The memory controller may update the plurality of map entries in the first map table, by the unit of a first map write segment, and may update the plurality of map entries in the second map table, by the unit of a second map write segment different from the first map write segment.

The memory controller may load a map cache entry including at least some of map entries in any one map table among the plurality of map tables, to a map cache.

The memory controller may load at least some of the plurality of map entries included in the first map table, to the map cache, by the unit of a first map read segment.

The memory controller may load at least some of the plurality of map entries included in the second map table, to the map cache, by the unit of a second map read segment different from the first map read segment.

The memory controller, mapping information of a target physical address corresponding to a target logical address, in the map cache, may determines a target map table corresponding to the target logical address among the plurality of map tables, based on a target map table indicating information indicating a map table corresponding to the target logical address. The memory controller may search for the mapping information of the target physical address, in map cache entries including some map entries of the target map table, among map cache entries in the map cache.

The target map table indicating information may be stored as a bitmap corresponding to the target logical address.

The memory controller may determine the target physical address corresponding to the target logical address, based on an offset between the target logical address and a start logical address in the mapping information corresponding to the target logical address.

Each of the plurality of map tables may include a first layer table including a plurality of first layer table entries and one or more second layer tables. Each of the second layer tables may include some of the plurality of map entries, and may correspond to one of the plurality of first layer table entries.

The memory controller may cache all first layer table entries in the first layer table, in the map cache, for each of the plurality of map tables.

The memory controller, in the case where a mapping information of a target physical address corresponding to a target logical address is included in the first map table and a first layer table entry corresponding to a second layer table including the mapping information is not cached, may search for the mapping information in map cache entries including some of the map entries of the first map table and map cache entries including some of the map entries of the second map table, among the map cache entries in the map cache.

The memory controller searches the map cache entries including some of the map entries of the first map table with a higher priority than the map cache entries including some of the map entries of the second map table, among the map cache entries in the map cache.

In another aspect, a memory controller to be described in embodiments of the disclosure may include a memory interface configured to communicate with a memory device stores a plurality of map tables each including a plurality of map entries indicating mapping information between one or more logical addresses and one or more physical addresses. Further, the memory controller may include a control circuit configured to control the memory device.

The plurality of map tables may include a first map table and a second map table. A size of a physical address region corresponding to each of a plurality of map entries in the second map table may be N times a size of a physical address region corresponding to each of a plurality of map entries in the first map table, where N is a natural number of 2 or greater.

In the case where N map entries corresponding to N consecutive physical address regions exist among the plurality of map entries in the first map table, the control circuit may add a group map entry indicating mapping information corresponding to a group of the N consecutive physical address regions, to the second map table.

Thereafter, the control circuit may erase the N map entries from the first map table.

The control circuit may update the plurality of map entries included in the first map table, by the unit of a first map write segment, and may update the plurality of map entries included in the second map table, by the unit of a second map write segment different from the first map write segment.

The control circuit may include a working memory which stores a map cache which caches some of the map entries included in any one among the plurality of map tables.

The control circuit may load at least some of the plurality of map entries included in any one map table among the plurality of map tables, to the map cache.

The control circuit, identifying a mapping information of a target physical address corresponding to a target logical address, in the map cache, may determine a target map table corresponding to the target logical address among the plurality of map tables, based on a target map table indicating information indicating a map table corresponding to the target logical address.

The control circuit may search for the mapping information of the target physical address, in map cache entries including some of map entries of the target map table, among map cache entries of the map cache.

The control circuit may determine the target physical address corresponding to the target logical address, based on an offset between the target logical address and a start logical address in the mapping information corresponding to the target logical address.

Each of the plurality of map tables may include a first layer table including a plurality of first layer table entries and one or more second layer tables. Each of the second layer tables may include some of the plurality of map entries, and may correspond to any one of the plurality of first layer table entries.

The control circuit may cache all first layer table entries included in the first layer table, in the map cache, for each of the plurality of map tables.

The control circuit, in the case where a mapping information of a target physical address corresponding to a target logical address is included in the first map table and a first layer table entry corresponding to a second layer table including the mapping information is not cached in the map cache, may search for the mapping information in map cache entries including some of the map entries of the first map table and map cache entries including some of the map entries of the second map table, among the map cache entries in the map cache.

In still another aspect, a method for operating a memory controller which controls a memory device, to be described in embodiments of the disclosure, may include determining whether N map entries corresponding to consecutive physical address regions exist among a plurality of map entries included in a first map table of a plurality of map tables stored in the memory device.

The memory device may store a plurality of map tables including a plurality of map entries indicating mapping information between one or more logical addresses and one or more physical addresses.

The plurality of map tables may include the first map table and a second map table.

A size of a physical address region corresponding to each of a plurality of map entries included in the second map table may be N times a size of a physical address region corresponding to each of map entries included in the first map table, N being a natural number of 2 or greater.

The method for operating a memory controller may include adding, when the N map entries corresponding to consecutive physical address regions exist, a group map entry indicating mapping information corresponding to a group of the N consecutive physical address regions, to the second map table of the plurality of map tables.

In still another aspect, a memory system to be described in embodiments of the disclosure may include a memory device including a data storage and a controller.

The controller may generate a first map table suitable for storing first map entries each representing a mapping relationship between one or more logical addresses and one or more physical addresses indicating a region of a first size within the data storage.

The controller may generate a second map table suitable for storing one or more second map entries each representing a mapping relationship between one or more logical addresses and one or more physical addresses indicating a region of a second size within the data storage, the second size being a multiple of the first size.

The controller may convert multiple first map entries indicating consecutive physical addresses into a single second map entry for storage in the second map table.

In still another aspect, a operating method of a controller for controlling access to a data storage may include generating a first map table suitable for storing first map entries each representing a mapping relationship between one or more logical addresses and one or more physical addresses indicating a storage region of a first size within the data storage.

The operating method of a controller may include generating a second map table suitable for storing one or more second map entries each representing a mapping relationship between one or more logical addresses and one or more physical addresses indicating a storage region of a second size within the data storage, the second size being a multiple of the first size.

The operating method of a controller may include converting multiple first map entries indicating consecutive physical addresses within the first map table into a single second map entry for storage in the second map table.

Embodiments of the disclosure may provide a memory system, a memory controller and an operating method thereof, capable of reducing a storage capacity for storing map tables.

Also, embodiments of the disclosure may provide a memory system, a memory controller and an operating method thereof, capable of increasing the size of an address region to be cached in a map cache.

Further, embodiments of the disclosure may provide a memory system, a memory controller and an operating method thereof, capable of efficiently caching a mapping information between a logical address and a physical address and thereby improving read/program performance.

BRIEF DESCRIPTION OF THE DRAWINGS

FIG. 12 is a diagram illustrating another example of structures of map tables in accordance with an embodiment of the disclosure.

DETAILED DESCRIPTION

Figure 1:
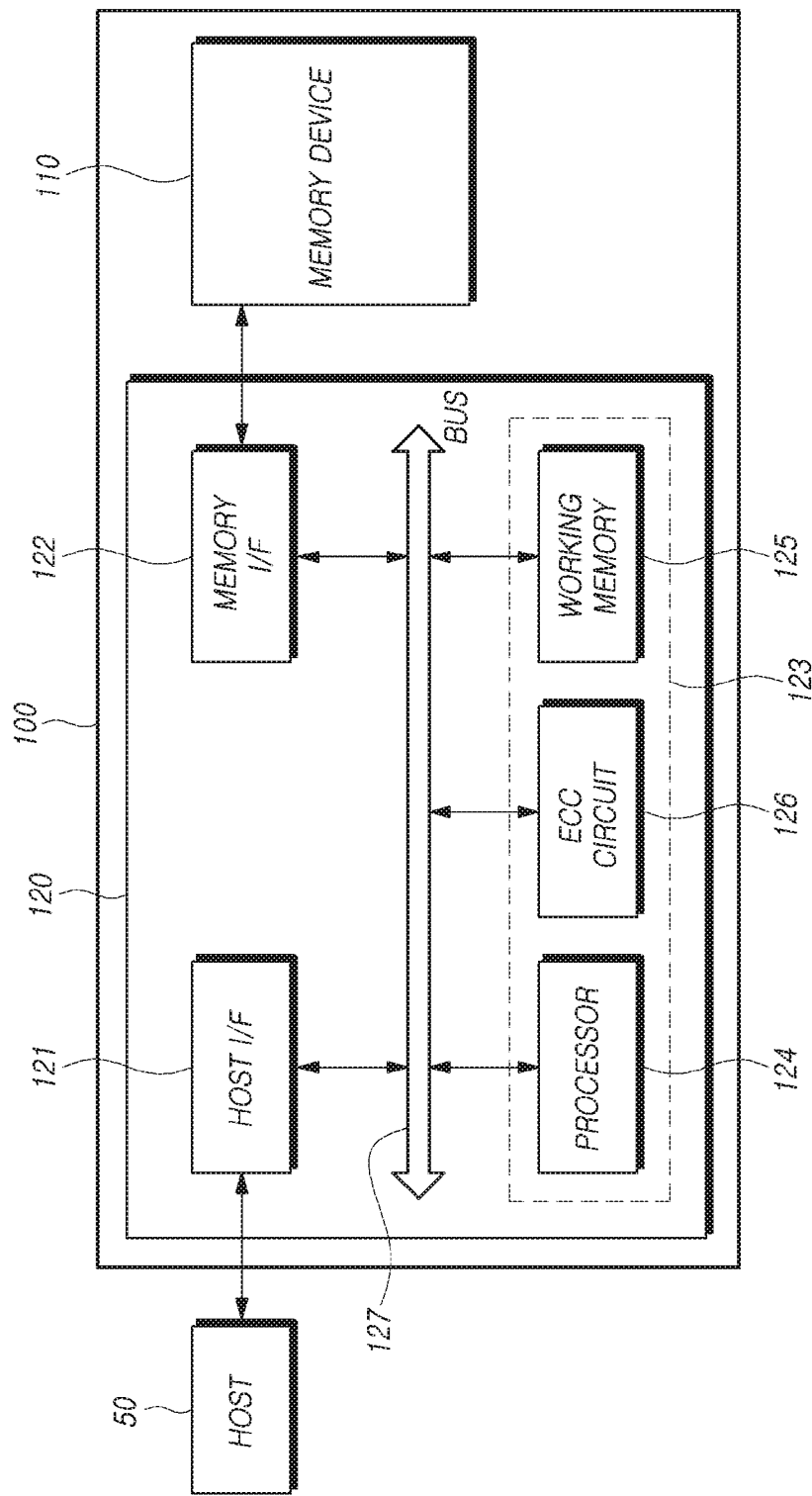
FIG. 1 is a block diagram schematically illustrating an example of a memory system in accordance with an embodiment of the disclosure.

Aspects of the disclosure are described in detail below with reference to the accompanying drawings. In the following description, the same elements are designated by the same reference numerals throughout the drawings. Further, detailed description of known functions and configurations incorporated herein are omitted when doing so may make the subject matter of the disclosure clearer. Open-ended terms, such as "comprising," "having," "including" and the like, used in the description and claims, should not be interpreted as being restricted to the specified elements or steps, unless specifically stated otherwise. Where an indefinite or definite article is used when referring to a singular noun, e.g. "a," "an," "the," this may include a plural of that noun unless specifically stated otherwise.

Also, in describing components of the disclosure, terms, such as first, second, A, B, (a), and/or (b) may be used. These terms are solely for the purpose of differentiating one component from another that otherwise have the same or similar names but not to imply or suggest the substance, order, sequence or number of such component.

In describing positional relationships of components, when it is described that at least two components are "connected," "coupled" or "linked," it is to be understood that the at least two components may be directly "connected," "coupled" or "linked" or may be indirectly "connected," "coupled" or "linked" with one or more other components interposed between the two components. Here, the other component(s) may be included in at least one of the at least two components which are "connected," "coupled" or "linked" with each other.

In describing time flow relationships of components, an operating method or a fabricating method, when pre and post relationships in terms of time or pre and post relationships in terms of flow are described, for example, by using "after," "following," "next" or "before," such description covers non-continuous cases, unless "immediately" or "directly" is used.

In the case where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

A memory system, a memory controller and an operating method thereof are described below with reference to the accompanying drawings through various embodiments. Throughout the specification, reference to "an embodiment," "another embodiment" or the like is not necessarily to only one embodiment, and different references to any such phrase are not necessarily to the same embodiment(s).

FIG. 1 is a block diagram schematically illustrating an example of a memory system 100 in accordance with an embodiment of the disclosure.

Referring to FIG. 1, the memory system 100 may include a memory device 110 which stores data, and a memory controller 120 which controls the memory device 110.

The memory device 110 includes a plurality of memory blocks and operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may be disposed in a memory block.

For example, the memory device 110 may be realized by a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized as a three-dimensional array structure. Embodiments of the disclosure may be applied to not only a flash memory device in which a charge storage layer is configured by a conductive floating gate but also a charge trap flash (CTF) in which a charge storage layer is configured by a dielectric layer.

The memory device 110 is configured to receive a command and an address from the memory controller 120 and access a region selected by the address in the memory cell array. In other words, the memory device 110 may perform an operation corresponding to the command, for a region selected by the address.

For example, the memory device 110 may perform a program operation, a read operation and an erase operation. In the program operation, the memory device 110 may program data to a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host 50 or in the absence of a request of the host 50.

For example, the memory controller 120 may control write (program), read, erase and background operations for the memory device 110. For example, the background operation may be a garbage collection (GC) operation, a wear leveling (WL) operation, a bad block management (BBM) operation, or the like.

Referring to FIG. 1, the memory controller 120 may include a host interface 121, a memory interface 122, and a control circuit 123.

The host interface 121 provides an interface for communication with the host 50. When receiving a command from the host 50, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface of the memory device 110 and the memory controller 120 in response to the control of the control circuit 123.

The control circuit 123 may perform the general control operations of the memory controller 120, thereby controlling the operations of the memory device 110. According to an embodiment, the control circuit 123 may include at least one of a processor 124 and a working memory 125, and in another embodiment, may further include an error detection and correction circuit (ECC circuit) 126.

The processor 124 may control general operations of the memory controller 120, and may perform a logic calculation. The processor 124 may communicate with the host 50 through the host interface 121, and may communicate with the memory device 110 through the memory interface 122.

The processor 124 may perform the function of a flash translation layer (FTL). The processor 124 may convert a logical block address (LBA), provided by the host 50, into a physical block address (PBA) through the flash translation layer (FTL). The flash translation layer (FTL) may receive a logical block address (LBA) and convert it into a physical block address (PBA), by using a map table.

There are various address mapping methods of the flash translation layer, depending on a mapping unit. Representative address mapping methods include a page mapping method, a block mapping method and a hybrid mapping method.

The processor 124 is configured to randomize data received from the host 50. For example, the processor 124 may randomize data received from the host 50, by using a randomizing seed. Randomized data as data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host 50.

The processor 124 may control the operation of the memory controller 120 by executing firmware (FW). In other words, in order to control general operations of the memory controller 120 and perform a logic calculation, the processor 124 may execute (drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL) which performs a converting function between a logical address requested to the memory system 100 from the host 50 and a physical address of the memory device 110, a host interface layer (HIL) which serves to analyze a command issued to the memory system 100 by the host 50 and transfers the command to the flash translation layer (FTL), and a flash interface layer (FIL) which transfers a command instructed by the flash translation layer (FTL) to the memory device 110.

The working memory 125 may store firmware, program code, a command and data which are necessary to drive the memory controller 120.

The working memory 125, for example, as a volatile memory, may include at least one among an SRAM (static RAM), a DRAM (dynamic RAM) and an SDRAM (synchronous DRAM).

The ECC circuit 126 may be configured to detect an error bit of data stored in the working memory 125 (that is, read data transferred from the memory device 110) by using an error correction code and correct the detected error bit.

The ECC circuit 126 may be configured to decode data by using an error correction code. The ECC circuit 126 may be realized by any of various code decoders. For example, a decoder which performs unsystematic code decoding or a decoder which performs systematic code decoding may be used.

For example, the ECC circuit 126 may detect an error bit by the unit of sector for each read data. Namely, each read data may be constituted by a plurality of sectors. A sector may mean a data unit smaller than a page as a read unit of a flash memory. Sectors constituting each read data may be matched with one another by the medium of an address.

The ECC circuit 126 may calculate a bit error rate (BER), and may determine whether it is possible to correct an error, by the unit of sector. For example, in the case where a bit error rate (BER) is higher than a reference value, the ECC circuit 126 may determine that a corresponding sector is uncorrectable or has failed. Conversely, in the case where a bit error rate (BER) is lower than the reference value, the ECC circuit 126 may determine that a corresponding sector is correctable or has passed.

The ECC circuit 126 may perform an error detection and correction operation sequentially for all read data. In the case where a sector included in read data is correctable, the ECC circuit 126 may omit an error detection and correction operation for a corresponding sector for next read data. If the error detection and correction operation for all read data is ended in this way, the ECC circuit 126 may detect a sector which is determined to the last to be uncorrectable. There may be one or more sectors that are determined to be uncorrectable. The ECC circuit 126 may transfer an information (for example, an address information) on a sector which is determined to be uncorrectable, to the processor 124.

A bus 127 may be configured to provide channels through which components 121, 122, 124, 125 and 126 of the memory controller 120 communicate. The bus 127 may include, for example, a control bus for transferring various control signals, commands and the likes, a data bus for transferring various data, and the like.

The above-described components 121, 122, 124, 125 and 126 of the memory controller 120 are only examples. Not all of these memory device components may be necessary in all embodiments. Some components may be combined. Also, the memory device 120 may contain one or more additional components.

The memory system 100 may be a module which is disposed externally to the host 50 or a module which is included in the host 50.

The memory device 110 is described in detail with reference to FIG. 2.

Figure 2:
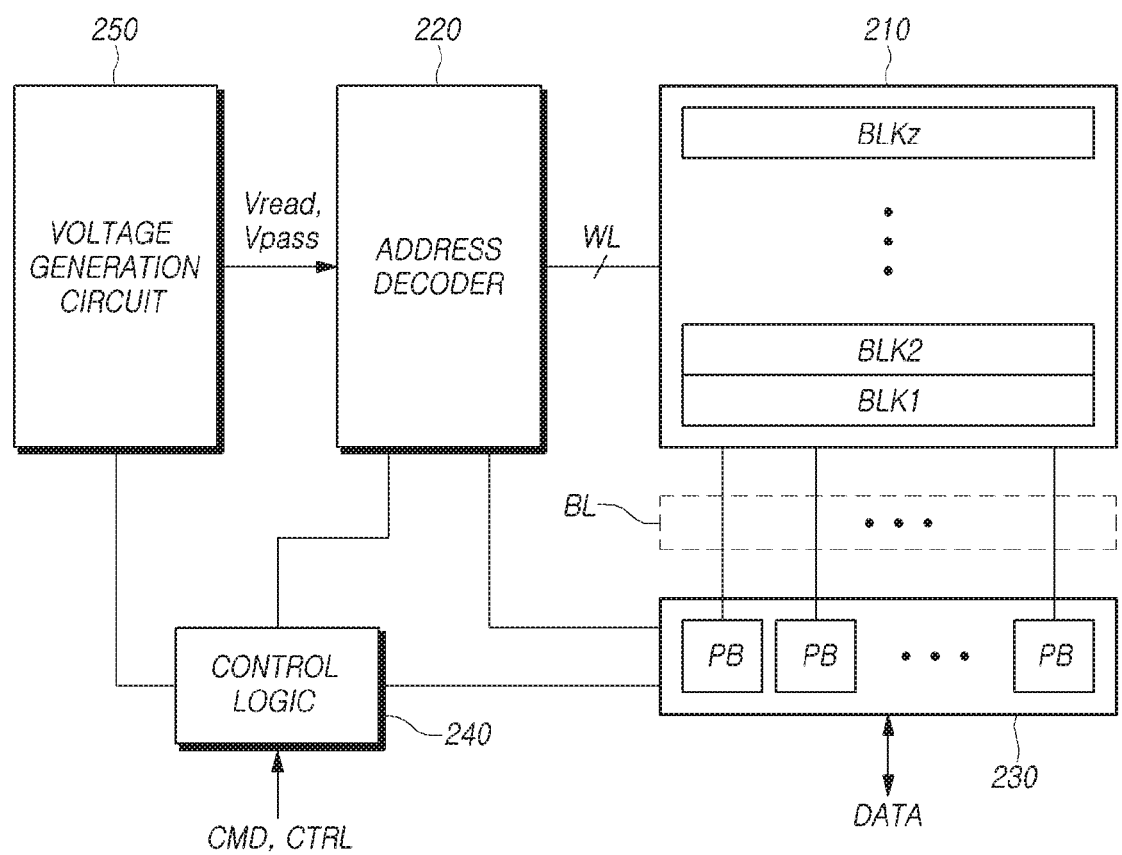
FIG. 2 is a block diagram schematically illustrating an example of a memory device in accordance with an embodiment of the disclosure.

FIG. 2 is a block diagram schematically illustrating an example of the memory device 110 in accordance with an embodiment of the disclosure.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structure. The memory cell array 210 may be configured by a memory cell array of a two-dimensional structure, or in another embodiment, may be configured by a memory cell array of a three-dimensional structure.

Each of the plurality of memory cells included in the memory cell array may store at least 1-bit data. Each of the plurality of memory cells included in the memory cell array 210 may be a single level cell (SLC) which stores 1-bit data. Each of the plurality of memory cells included in the memory cell array 210 may be a multi-level cell (MLC) which stores 2-bit data. Each of the plurality of memory cells included in the memory cell array 210 may be a triple level cell (TLC) which stores 3-bit data. Each of the plurality of memory cells included in the memory cell array 210 may be a quad level cell (QLC) which stores 4-bit data. In still another embodiment, the memory cell array 210 may include a plurality of memory cells each of which stores 5 or more-bit data. As can be seen from the description above, the number of memory cells in each of the plurality of memory cells included in the memory cell array may vary depending on design.

The firmware described above with reference to FIG. 1 may be stored in at least one of the plurality of memory blocks described above. Also, map tables which indicate mapping information between logical addresses and physical addresses may be stored in at least one of the plurality of memory blocks described above.

Referring to FIG. 2, the address decoder 220, the read and writhe circuit 230, the control logic 240 and the voltage generation circuit 250 may operate as peripheral circuits which drive the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer in the memory device 110.

The address decoder 220 may be configured to decode a block address in the received address. The address decoder 220 may select at least one memory block depending on the decoded block address. The address decoder 220 may apply a read voltage Vread generated in the voltage generation circuit 250 to a word line selected in a memory block selected in a read voltage applying operation during a read operation, and may apply a pass voltage Vpass to the remaining unselected word lines. Further, the address decoder 220 may apply a verify voltage generated in the voltage generation circuit 250 to a word line selected in a selected memory block in a program verify operation, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed by the unit of page. An address received when a read operation or a program operation is requested may include a block address, a row address and a column address.

The address decoder 220 may selected one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for performing a data processing function, and in another embodiment, may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation, and may latch sensed data by sensing, through sensing nodes, that the amounts of current flowing depending on the programmed states of the corresponding memory cells have changed. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers (or page registers).

The control logic 230 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
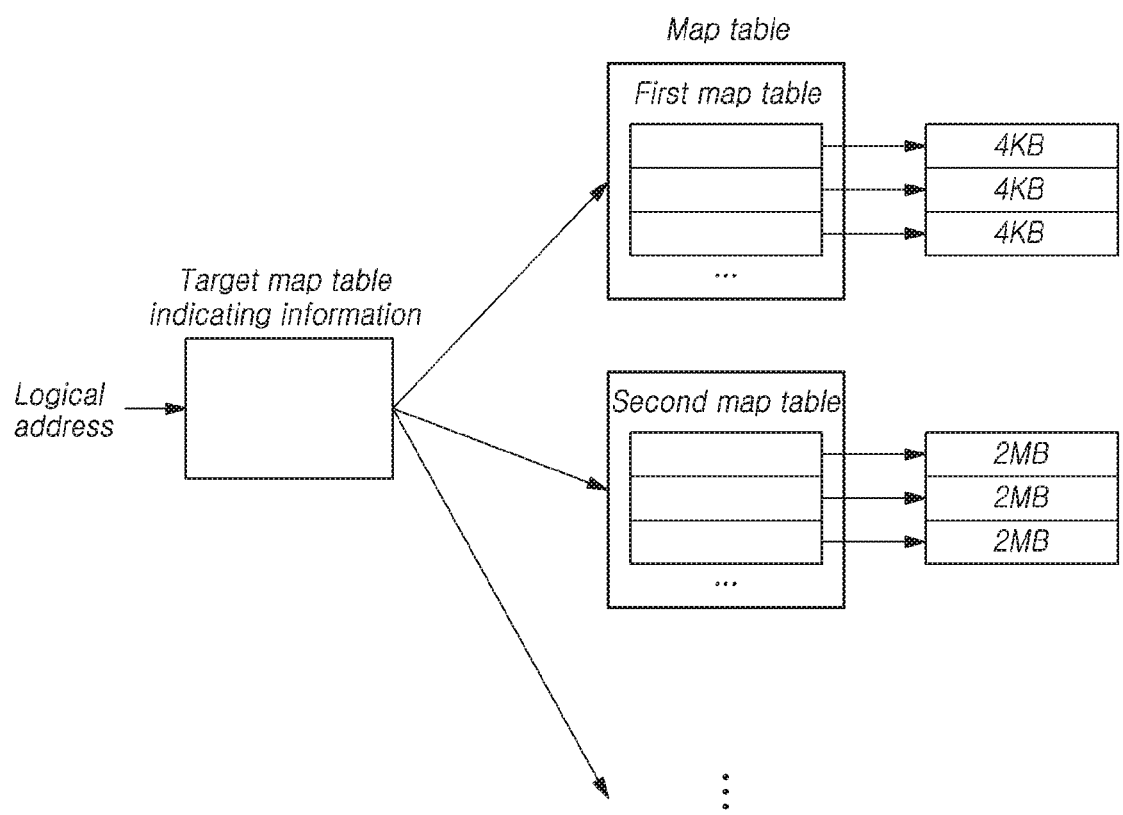
FIG. 3 is a diagram illustrating an example of structures of map tables in accordance with an embodiment of the disclosure.

FIG. 3 is a diagram illustrating an example of structures of map tables in accordance with an embodiment of the disclosure.

The memory device 110 may store a plurality of map tables.

Each of the plurality of map tables may include a plurality of map entries each of which indicates mapping information between one or more logical addresses and one or more physical addresses.

Mapping information between a logical address and a physical address may indicate information on a logical address region and a physical address region mapped to the corresponding logical address region. The sizes of a logical address region and the corresponding physical address region may be determined to be the same.

A map entry included in a map table may include an information on a start logical address and a start physical address. The size of a logical address region and a physical address region corresponding to the mapping information of a map entry may be a fixed value (e.g., 4 KB) for each map entry. A minimum size of a logical address region and a physical address region may be a page size (e.g., 4 KB or 8 KB).

A logical address region corresponding to the mapping information of a map entry may be determined by a start logical address and the size of the logical address region which may be indicated by the corresponding map entry. Further, a physical address region corresponding to the mapping information of a map entry may be determined by a start physical address and the size of the physical address region which may be indicated by the corresponding map entry.

For example, consider a start logical address indicated by a map entry is 0, a start physical address is 100 and the size of a logical address region and a physical address region corresponding to the mapping information of the map entry is 4 KB.

In this example, the corresponding map entry indicates information that a logical address region which starts from the logical address 0 and has the size of 4 KB is mapped to a physical address region which starts from the physical address 100 and has the size of 4 KB.

In another example, consider a start logical address indicated by a map entry is 100, a start physical address is 300 and the size of a logical address region and a physical address region corresponding to the mapping information of the map entry is 4 MB.

In this example, the corresponding map entry indicates information that a logical address region which starts from the logical address 100 and has the size of 4 MB is mapped to a physical address region which starts from the physical address 300 and has the size of 4 MB.

Referring to FIG. 3, the plurality of map tables stored in the memory device 110 may include a first map table and a second map table.

The size of physical address regions respectively corresponding to a plurality of map entries included in the first map table and the size of physical address regions respectively corresponding to a plurality of map entries included in the second map table may be different from each other.

In detail, the size of a physical address region corresponding to one map entry included in the second map table may be N times the size of a physical address region corresponding to one map entry included in the first map table, where N is a natural number of 2 or greater here and throughout the specification.

For instance, in FIG. 3, the size of a physical address region corresponding to one map entry included in the first map table may be 4 KB, and the size of a physical address region corresponding to one map entry included in the second map table may be 2 MB=512*4 KB.

In an embodiment in which map tables are configured as illustrated in FIG. 3, each map entry included in the first map table may correspond to a physical address region having the size of 4 KB, and each map entry included in the second map table may correspond to a physical address region having the size of 2 MB.

Therefore, in order to store mapping information corresponding to the same physical address region, the first map table requires map entries, the number of which is 512 times greater than the number of map entries in the second map table. That is to say, the second map table may efficiently store mapping information corresponding to the same physical address region with a smaller number of map entries than the first map table.

However, in order to store mapping information in the second map table, a condition that consecutive logical address regions of 2 MB are mapped with consecutive physical address regions of 2 MB needs to be satisfied. Such a condition may occur, for example, when the host 50 requests sequential write for data of consecutive logical addresses to the memory system 100.

Thus, the memory controller 120 may first store mapping information in a map entry of the first map table. Thereafter, when N (N is a natural number of 2 or greater) number of map entries respectively corresponding to N consecutive physical address regions exist among the map entries included in the first map table, the memory controller 120 may generate a group map entry indicating mapping information corresponding to the entirety of the N physical address regions, that is, the group of the N physical address regions, and then, may add the group map entry to the second map table.

If the group map entry is added to the second map table, the memory controller 120 may erase the above-described N map entries from the first map table.

The N consecutive physical address regions may mean that an entire physical address region obtained by combining N physical address regions may be expressed in a form of one start physical address and a single length or in a form of one start physical address and one end physical address.

For example, if there are four physical address regions 100~101, 101~102, 102~103 and 103~104, since the four physical address regions may be expressed as 100~104, the four physical address regions are consecutive to one another. On the other hand, if there are four physical address regions 100~101, 101~103, 104~105 and 105~106, since a region 103~104 does not belong to any of the four physical address regions, the four physical address regions are not consecutive to one another.

In an embodiment in which there are a plurality of map tables as described above, in order to search for mapping information corresponding to a target logical address, first, a target map table which indicates the corresponding mapping information is to be determined among the plurality of map tables.

The memory controller 120 may determine the target map table as a map table corresponding to the target logical address, based on target map table indicating information which indicates a map table corresponding to the target logical address.

The target map table indicating information indicates a map table corresponding to a target logical address.

For instance, target map table indicating information may indicate information that mapping information corresponding to a target logical address 0 is stored in the first map table. For another instance, target map table indicating information may indicate information that mapping information corresponding to a target logical address 1000 is stored in the second map table.

The target map table indicating information may be configured in various formats.

For instance, target map table indicating information may be a bitmap corresponding to a group of logical addresses including a target logical address. The number of logical addresses (i.e., a number of bits) in the group of logical addresses (i.e., the bitmap) may correspond to the number of logical addresses in all of map entries in the first map table or in a single map entry of the second map table. The memory controller 120 may search for a bit corresponding to a target logical address in a bitmap corresponding to logical addresses, and thereby, may determine a target map table based on the value of the searched bit. In the discussion below, it is assumed that target map table indicating information includes bitmap information indicating whether 512 physical address regions respectively corresponding to logical address regions expressed as logical addresses 0~511 are consecutive to one another (e.g., consecutive in the case 1 and inconsecutive in the case of 0). A case of searching for a target map table for a logical address 130 is assumed.

If the value of bitmap information corresponding to the logical address 130 is 1, the bit information represents that 512 physical address regions corresponding to 512 logical addresses including the logical address 130 are consecutive to one another, in which case a map entry corresponding to the entirety of the 512 physical address regions may be included in a single map entry of the second map table. Therefore, the target map table for the logical address 130 may be determined as the second map table.

Conversely, if the value of bitmap information corresponding to the logical address 130 is 0, the bit information may represents that 512 physical address regions corresponding to 512 logical address including the logical address 130 are inconsecutive to one another, in which case map entries respectively corresponding to the 512 physical address regions may be included in all of the map entries of the first map table. Therefore, the target map table for the logical address 130 may be determined as the first map table.

For another instance, target map table indicating information may be a hash table or a tree corresponding to a logical address.

Target map table indicating information may be stored in the memory device 110 similarly to map tables. The memory controller 120 may load the target map table indicating information stored in the memory device 110 to the working memory 125.

Below, the above-described method will be described in detail with reference to FIGS. 4 and 5.

Figure 4:
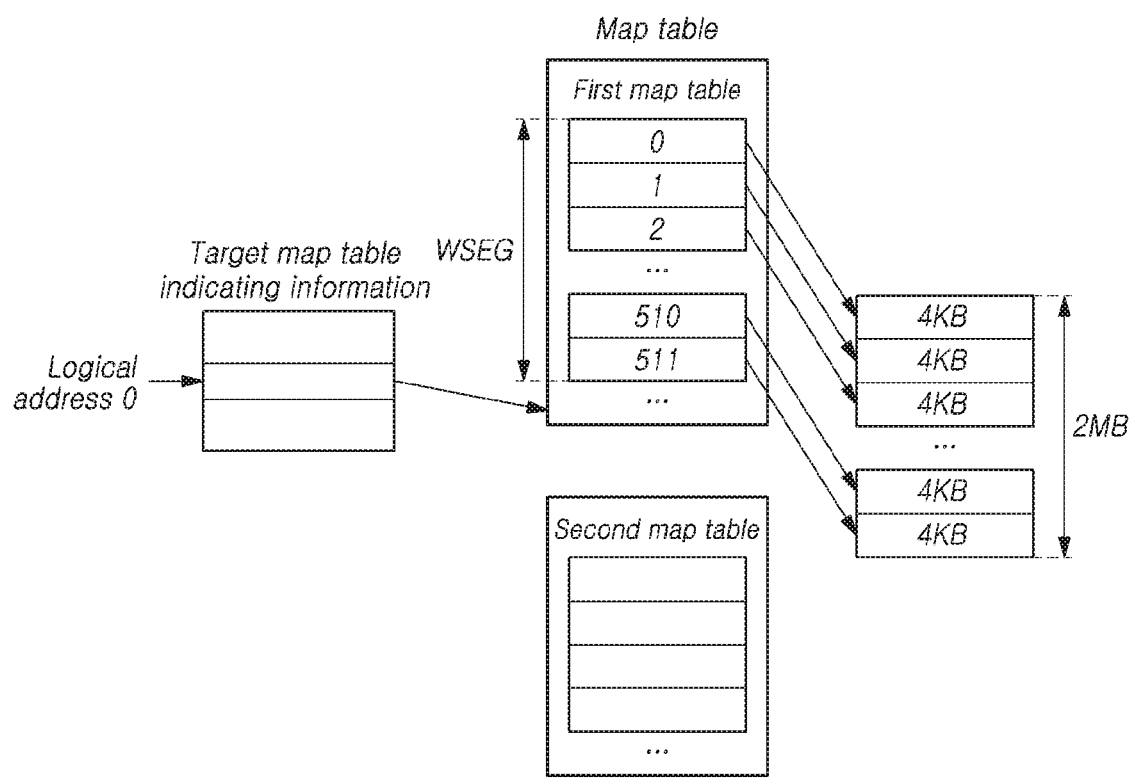
FIG. 4 is a diagram illustrating an example in which N map entries corresponding to consecutive physical address regions exist in a first map table in accordance with an embodiment of the disclosure.

FIG. 4 is a diagram illustrating an example in which 512 number of map entries corresponding to consecutive physical address regions exist in the first map table in accordance with an embodiment of the disclosure.

Referring to FIG. 4, the first map table includes 512 map entries respectively corresponding to logical addresses 0, 1, 2, . . . , 510, 511. The 512 map entries correspond to respective physical address regions of 4 KB each, which regions are different from one another. The 512 physical address regions are consecutive to one another, and the size of the 512 physical address regions in their entirety is 4 KB*512=2 MB.

Since a map entry corresponding to a logical address 0 exists in the first map table, a target map table for a target logical address 0 may be the first map table. A target map table indicating information may indicate that a target map table corresponding to the target logical address 0 is the first map table.

In FIG. 4, the above-described 512 map entries may configure one first map write segment WSEG. The first map write segment WSEG may be a unit by which the first map table stored in the memory device 110 is updated when a change occurs in the first map table. In other words, the memory controller 120 may update the plurality of map entries included in the first map table by the unit of the first map write segment WSEG.

Figure 5:
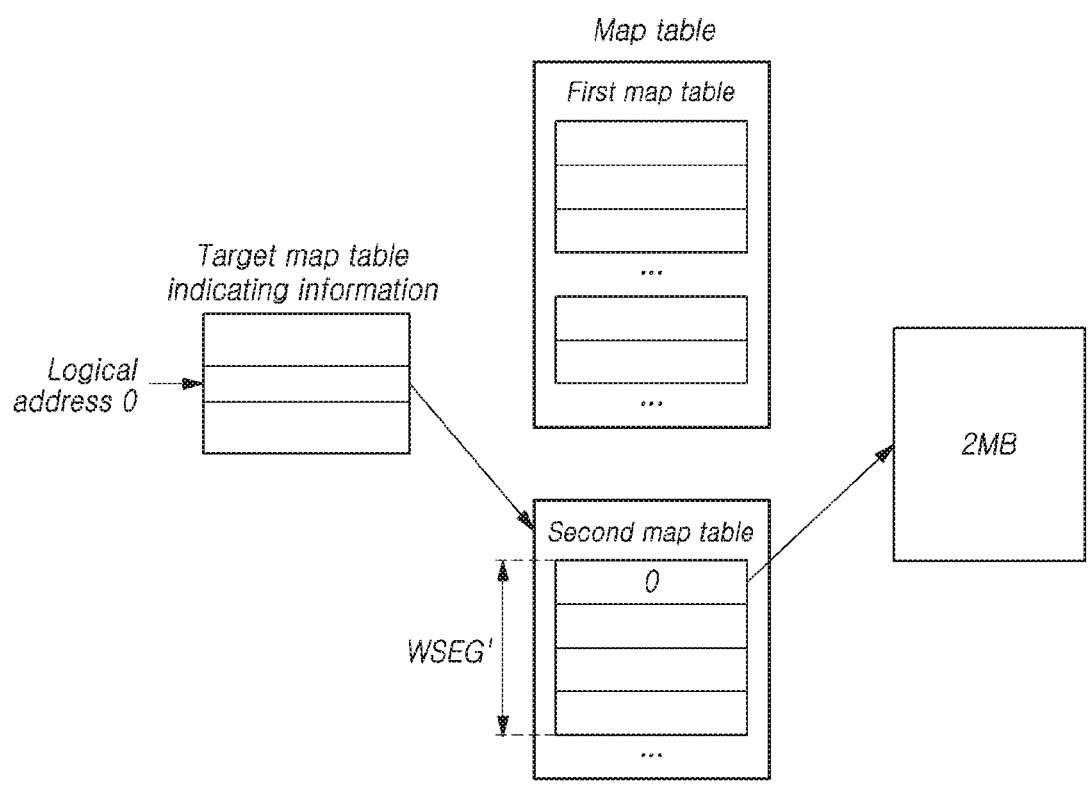
FIG. 5 is a diagram illustrating an example in which a map entry indicating mapping information corresponding to the entirety of the N consecutive physical address regions of FIG. 4 is added to a second map table.

FIG. 5 is a diagram illustrating an example in which a map entry indicating mapping information corresponding to the entirety of the N consecutive physical address regions of FIG. 4 is added to the second map table.

Referring to FIG. 5, a group map entry corresponding to the group of the 512 physical address regions corresponding to the 512 map entries of the first map table in FIG. 4 may be newly added to the second map table.

The start logical address of the group map entry added to the second map table is set to 0. Namely, the group map entry added to the second map table indicates information that a 2 MB sized logical address region of which the start logical address is 0 is mapped to a 2 MB sized physical address region.

In this case, the entire physical address regions mapped to the 512 map entries of the first map table in FIG. 4 may be accessed through the second map table. Therefore, the above-described 512 map entries need not be stored in the first map table any more. Thus, the memory controller 120 may erase the above-described 512 map entries from the first map table.

Unlike the arrangement of FIG. 4, since a map entry corresponding to the logical address 0 exists now in the second map table, a target map table for a target logical address 0 may be the second map table. Target map table indicating information may indicate that a target map table corresponding to the target logical address 0 is the second map table.

If the map tables are changed from those shown in FIG. 4 to those shown in FIG. 5, the 512 map entries are erased in the first map table, and one group map entry is added to the second map table.

Hence, because the number of map entries included in the entire map tables decreases (e.g., from 512 map entries of the first map table to a single map entry of the second map table), space used to store entire map tables in the memory device 110 is advantageously reduced.

Moreover, because the number of map entries used to indicate the same physical address region decreases, a map cache of the same size may cover a larger physical address region, thus improving the storage efficiency of the memory device 110.

In addition, because the number of map entries to be loaded to a map cache to access mapping information indicating the same physical address region decreases, the read performance of the memory system 100 is improved.

In particular, in the case where the memory system 100 performs a sequential read request received from the host 50, since the number of map entries which need to be referred to obtain an information on consecutive physical address regions significantly decreases, the read performance of the memory system 100 may be improved.

Similar to the first map table, the second map table may also be updated by the unit of a second map write segment WSEG'. In other words, the memory controller 120 may update the plurality of map entries included in the second map table by the unit of the second map write segment WSEG'.

The sizes of the first map write segment WSEG and the second map write segment WSEG' described above may be the same as or different from each other.

Figure 6:
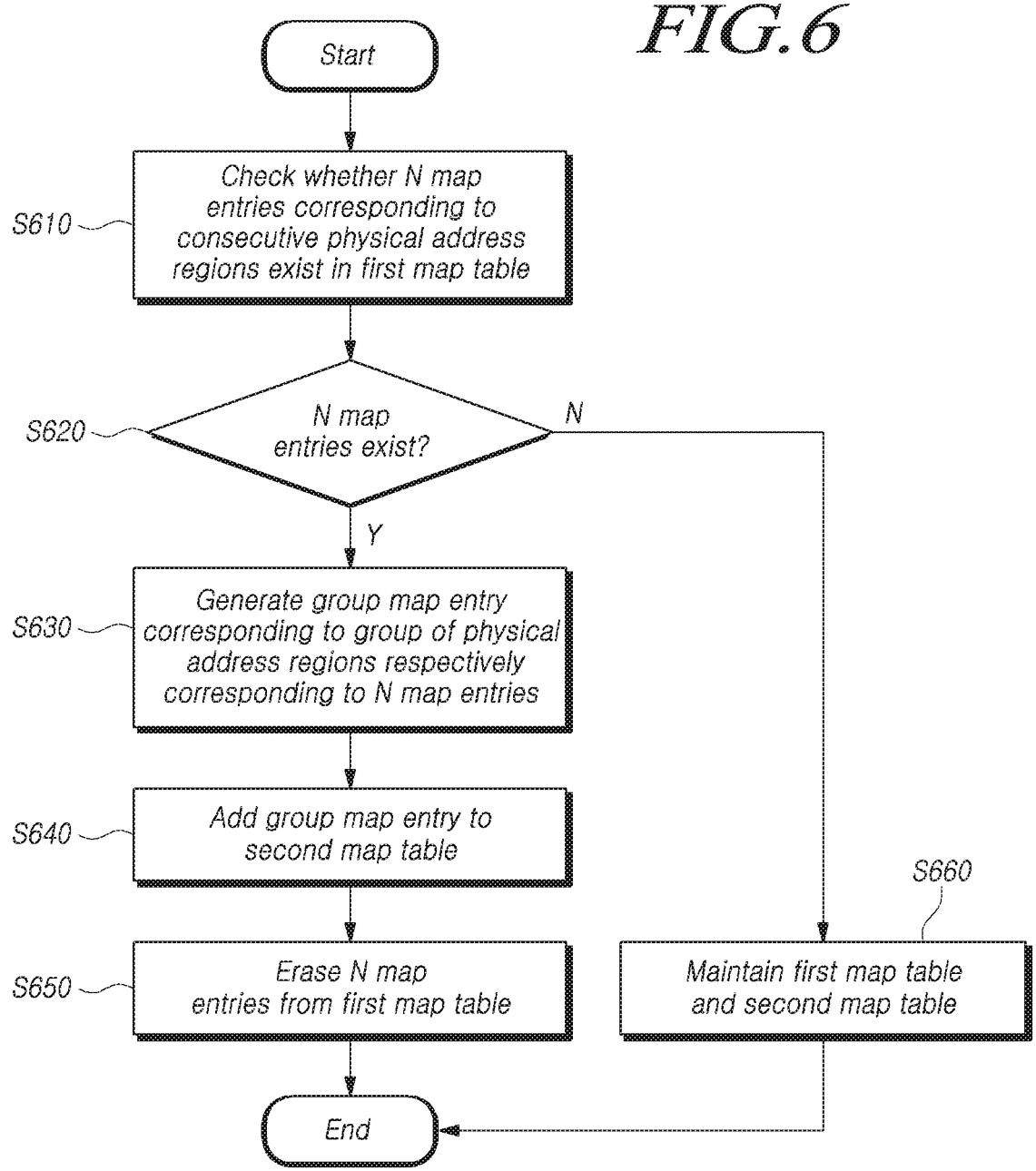
FIG. 6 is a flow chart of a method for performing an operation, such as that described with reference to FIGS. 4 and 5.

FIG. 6 is a flow chart of a method for performing the operation described above with reference to FIGS. 4 and 5.

First, the memory controller 120 determines whether N map entries corresponding to consecutive physical address regions exist among the map entries included in the first map table (S610), where N is a natural number of 2 or greater.

If it is determined at the step S610 that N map entries corresponding to consecutive physical address regions exist (S620-Y), the memory controller 120 generates new mapping information corresponding to the group of N physical address regions indicated by the N map entries, respectively, that is, a group map entry (S630). In other words, the memory controller 120 converts the N map entries into the group map entry by selecting information (e.g., the start logical and physical addresses and the length) from the N map entries and forming the group map entry with the selected information.

The memory controller 120 adds the group map entry generated at the step S630 to the second map table (S640).

Then, the memory controller 120 erases the above-described N map entries from the first map table (S650).

If it is determined at the step S610 that N map entries corresponding to consecutive physical address regions do not exist (S620-N), the memory controller 120 maintains the first map table and the second map table as they are (S660).

Figure 7:
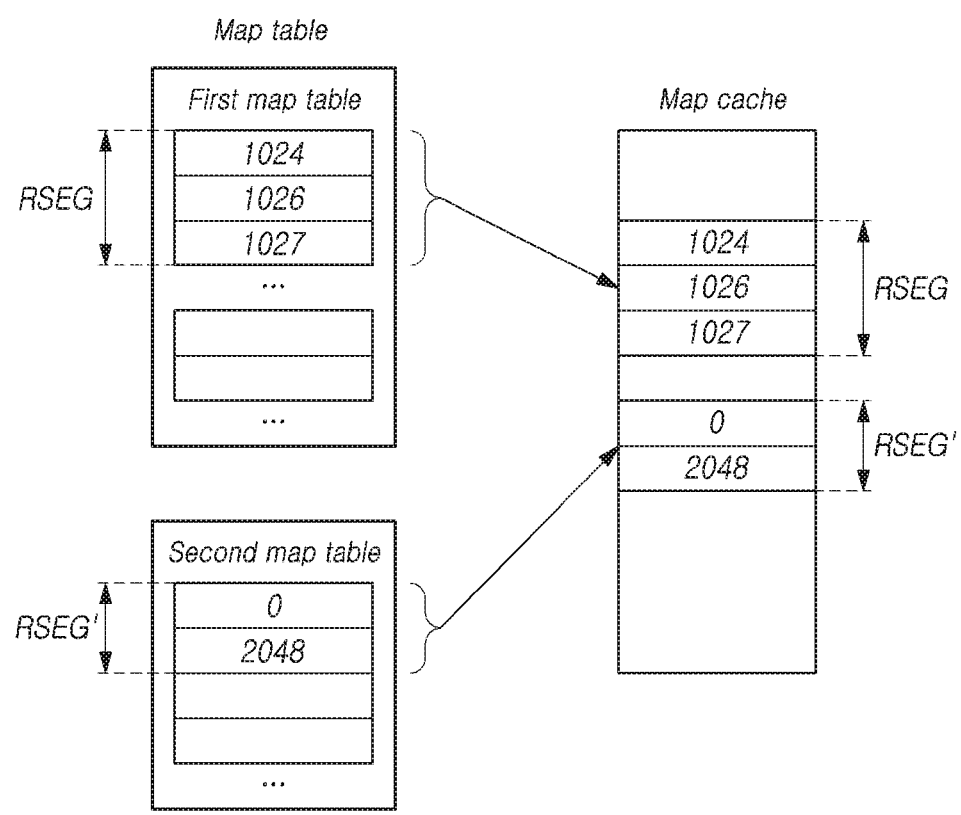
FIG. 7 is a diagram illustrating an example in which map entries are loaded to a map cache in accordance with an embodiment of the disclosure.

FIG. 7 is a diagram illustrating an example in which map entries are loaded to a map cache in accordance with an embodiment of the disclosure. While FIGS. 3 to 6 are directed to showing how a second map table is created and stored in a memory device 110, e.g., NAND, during a map update, FIGS. 7 to 15 are directed to showing how to load the map table into a map cache during a read operation.

The memory controller 120 may load a map cache entry including a map entry included in any one of map tables, to a map cache. The memory controller 120 may use a partial region of the working memory 125 as the map cache.

The map cache may include at least one map cache entry. Each map cache entry may include at least one map entry.

Since map entries included in different map tables may be loaded to one map cache, a conventional map cache structure may be used.

In FIG. 7, among the map entries included in the first map table, map entries corresponding to start logical addresses 1024, 1026 and 1027 are loaded to the map cache.

Further, among the map entries included in the second map table, map entries corresponding to start logical addresses 0 and 2048 are loaded to the map cache.

The memory controller 120 may load some of the map entries stored in a map table to the map cache by the unit of a specified map read segment.

For instance, the memory controller 120 may load some of the map entries stored in the first map table to the map cache by the unit of a first map read segment RSEG.

For another instance, the memory controller 120 may load some of the map entries stored in the second map table to the map cache by the unit of a second map read segment RSEG'.

The sizes of the first map read segment RSEG and the second map read segment RSEG' described above may be the same as or different from each other.

The size of the first map write segment WSEG described above with reference to FIG. 4 may be larger than the size of the first map read segment RSEG. Further, the size of the second map write segment WSEG' described above with reference to FIG. 5 may be larger than the size of the second map read segment RSEG'.

If the size of a map write segment is smaller than the size of a map read segment, even though N map entries (which configure one map write segment) corresponding to N consecutive physical address regions, respectively, are combined into one map entry, a map entry other than the N map entries may be additionally loaded to the map cache. Thus, the efficiency of loading map entries to the map cache may deteriorate.

However, if the size of a map write segment excessively increases, a problem may be caused in that a probability of N map entries corresponding to N consecutive physical address regions, respectively, existing decreases. Therefore, the size of a map write segment may be set to a suitable value that is equal to or larger than the size of a map read segment.

Hereafter, a case where the map entries of the map tables described above with reference to FIG. 7 are loaded to the map cache is described with reference to FIGS. 8 to 10.

Figure 8:
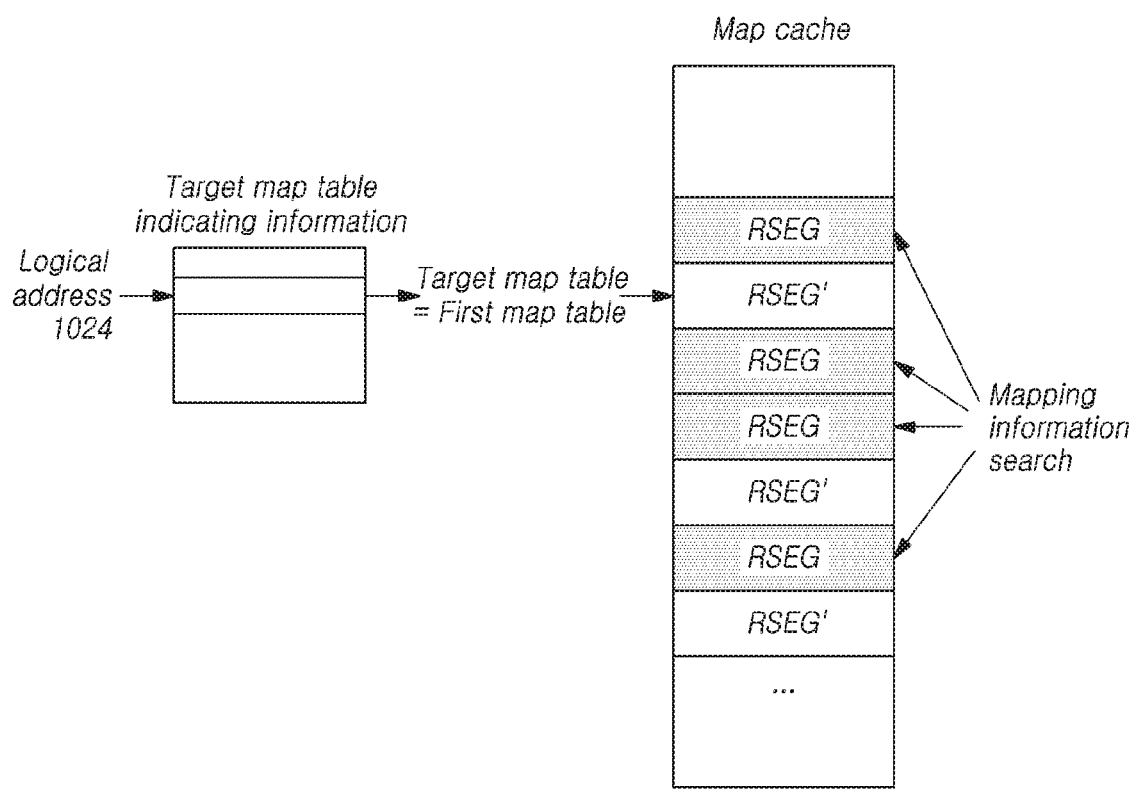
FIG. 8 is a diagram illustrating an example in which mapping information is searched for in the map cache in accordance with an embodiment of the disclosure.

FIG. 8 is a diagram illustrating an example in which mapping information is searched for in the map cache in accordance with an embodiment of the disclosure.

In FIG. 8, a case where mapping information of a target physical address corresponding to a logical address 1024 is searched for in the map cache is assumed. Referring to FIG. 7, the mapping information of the target physical address corresponding to the logical address 1024 exists among the map entries of the first map table.

The memory controller 120 may check based on target map table indicating information that a target map table corresponding to the logical address 1024 is the first map table.

Thus, the memory controller 120 searches for the mapping information of the target physical address for the logical address 1024, in map cache entries which are some of the map entries of the first map table, among the map cache entries included in the map cache.

In FIG. 7, the map entries of the first map table are loaded to the map cache by the unit of the first map read segment RSEG. Thus, the memory controller 120 may search for the mapping information for the logical address 1024, in map cache entries which are loaded by the unit of the first map read segment RSEG, among the map cache entries loaded to the map cache.

Figure 9:
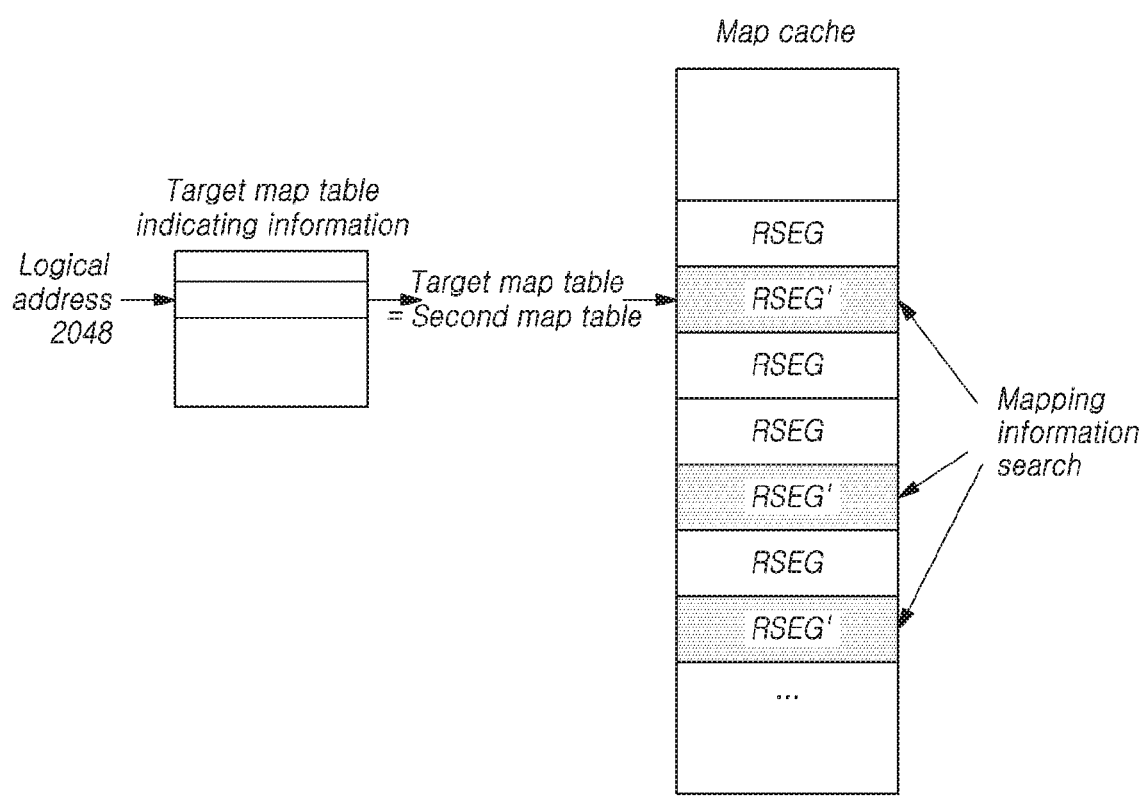
FIG. 9 is a diagram illustrating another example in which mapping information is searched for in the map cache in accordance with an embodiment of the disclosure.

FIG. 9 is a diagram illustrating another example in which mapping information is searched for in the map cache in accordance with an embodiment of the disclosure.

In FIG. 9, a case where mapping information corresponding to a logical address 2048 is searched for in the map cache is assumed. Referring to FIG. 7, the mapping information corresponding to the logical address 2048 exists among the map entries of the second map table.

The memory controller 120 may check based on a target map table indicating information that a target map table corresponding to the logical address 2048 is the second map table.

Thus, the memory controller 120 searches for the mapping information for the logical address 2048, in map cache entries which are some of the map entries of the second map table, among the map cache entries included in the map cache.

In FIG. 7, the map entries of the second map table are loaded to the map cache by the unit of the second map read segment RSEG'. Thus, the memory controller 120 searches for the mapping information for the logical address 2048, in map cache entries which are loaded by the unit of the second map read segment RSEG', among the map cache entries loaded to the map cache.

Figure 10:
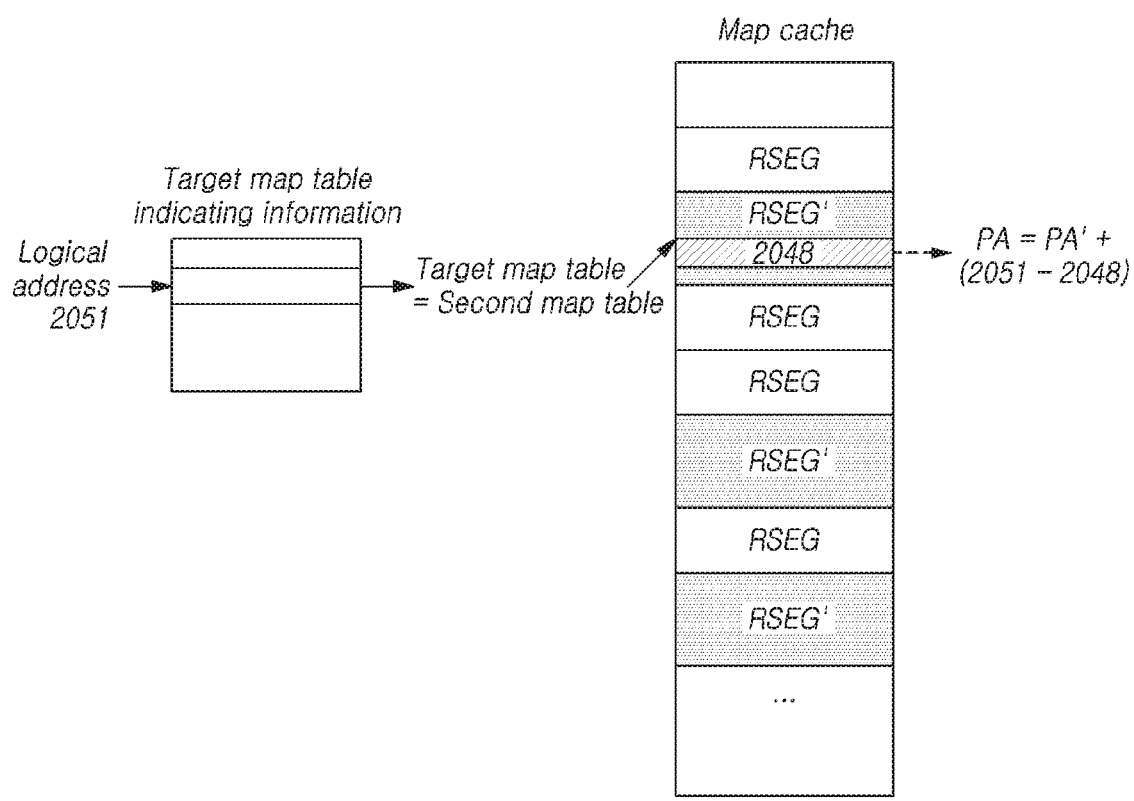
FIG. 10 is a diagram illustrating an example in which a physical address for a target logical address is determined based on mapping information searched in the map cache in accordance with an embodiment of the disclosure.

FIG. 10 is a diagram illustrating an example in which a physical address for a target logical address is determined based on mapping information searched in the map cache in accordance with an embodiment of the disclosure.

In FIG. 10, a case where mapping information corresponding to a logical address 2051 is searched for in the map cache is assumed.

The memory controller 120 may check based on a target map table indicating information that a target map table corresponding to the logical address 2051 is the second map table.

Thus, the memory controller 120 searches for the mapping information for the logical address 2051, in map cache entries which are some of the map entries of the second map table.

A start logical address indicated by a map entry including the mapping information for the logical address 2051, among the map entries loaded to the map cache, is 2048. The corresponding map entry indicates a physical address region which is mapped to a logical address region corresponding to 512*4 KB=2 MB from the start logical address 2048, and the logical address 2051 is included in this logical address region.

Thus, the memory controller 120 may determine a physical address corresponding to the logical address 2051 based on an offset between the logical address 2051 and the start logical address 2048 included in the mapping information corresponding to the logical address 2051.

For instance, it is assumed that a start physical address PA' of the physical address region corresponding to the map entry including the mapping information for the logical address 2051 is 10000.

In this case, a physical address PA corresponding to the logical address 2051 becomes 10000+(2051−2048)=10003.

Figure 11:
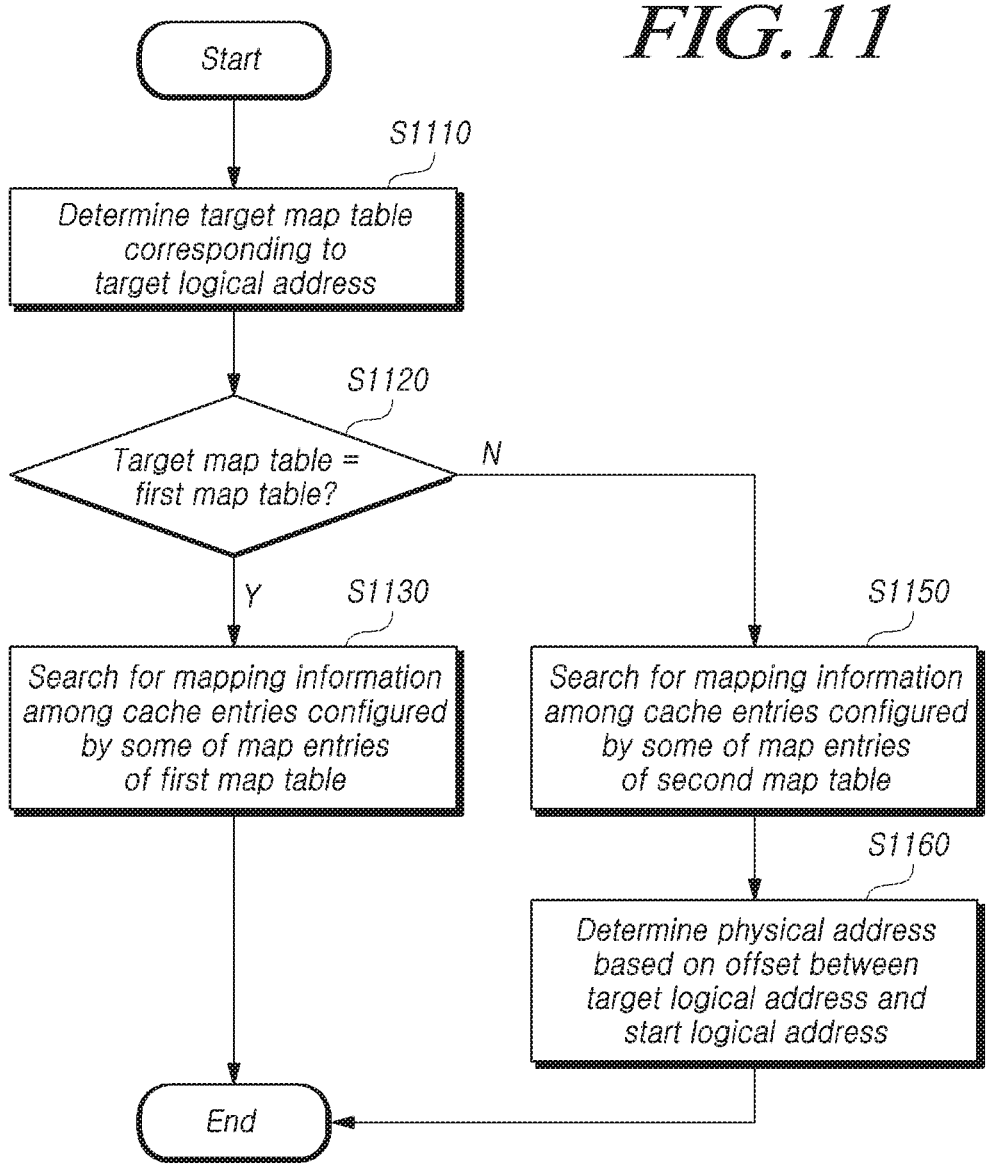
FIG. 11 is a flow chart of a method for performing an operation, such as that described with reference to FIGS. 7 to 10.

FIG. 11 is a flow chart of a method for performing the operation described above with reference to FIGS. 7 to 10.

The memory controller 120 determines a target map table corresponding to a target logical address (S1110).

If the target map table determined at the step S1110 is the first map table (S1120-Y), the memory controller 120 searches for mapping information in map cache entries which are some of the map entries of the first map table, among the map cache entries included in the map cache (S1130).

On the other hand, if the target map table determined at the step S1110 is not the first map table (S1120-N), the memory controller 120 determines that the target map table is the second map table (S1140).

Then, the memory controller 120 searches for mapping information in map cache entries which are some of the map entries of the second map table, among the map cache entries included in the map cache (51150).

The memory controller 120 determines a physical address corresponding to the target logical address, based on an offset between the target logical address and a start logical address, as described above with reference to FIG. 10 (S1160).

FIG. 12 is a diagram illustrating another example of structures of map tables in accordance with an embodiment of the disclosure.

Each of a plurality of map tables stored in the memory device 110 may include a first layer (L1) table and at least one second layer (L2) table.

The first layer (L1) table may include a plurality of first layer (L1) table entries. Each first layer (L1) table entry may correspond to a logical address region, and may indicate a second layer (L2) table corresponding to the corresponding logical address region.

The second layer (L2) table may include some of the plurality of map entries included in the map table. Each second layer (L2) table included in the map table may correspond to any one among the first layer (L1) table entries of the first layer (L1) table included in the corresponding map table.

Among the plurality of map tables stored in the memory device 110, each of a first map table and a second map table may include a first layer (L1) table and at least one second layer (L2) table.

Similar to the embodiment of FIG. 3, the size of a physical address region corresponding to one map entry included in the first map table may be 4 KB, and the size of a physical address region corresponding to one map entry included in the second map table may be 2 MB=512*4 KB.

The reason why one map table is divided into a first layer (L1) table and a second layer (L2) table is to more quickly search for a map entry corresponding to a target logical address.

By using the information of the first layer (L1) table, it is possible to quickly search for candidate map entries which may correspond to a target logical address, among all map entries of a map table, thereby narrowing the search scope or range. By searching for a map entry corresponding to the target logical address among the candidate map entries, it is possible to quickly search for such map entry, as compared to searching for such map entry among all map entries of the map table.

Figure 13:
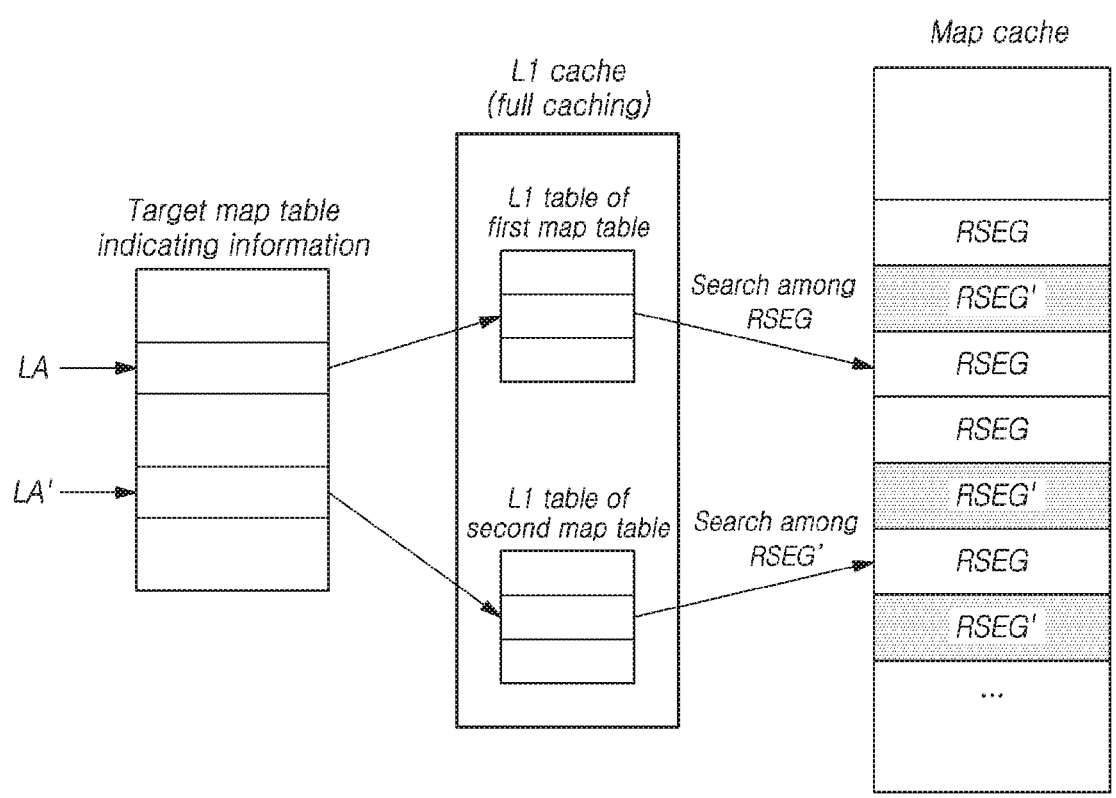
FIG. 13 is a diagram illustrating an example in which mapping information are searched for in a map cache, in the case where first layer (L1) tables included in the map tables of FIG. 12 are fully cached.

FIG. 13 is a diagram illustrating an example in which mapping information are searched for in a map cache, in the case where first layer (L1) tables included in the map tables of FIG. 12 are fully cached.

That the first layer (L1) tables are fully cached means that all first layer (L1) table entries of the first layer (L1) tables included in the respective map tables are cached.

For instance, the first layer (L1) tables included in the respective map tables may be stored in a first layer (L1) cache which exists separately from a map cache. The first layer (L1) cache may be included in the working memory 125 of the memory controller 120.

Referring to FIG. 13, the memory controller 120 determines a target map table corresponding to a target logical address, by using target map table indicating information. For instance, it is assumed that a target map table for a target logical address LA is the first map table and a target map table for a target logical address LA' is the second map table.

If the target map tables are determined, the memory device 110 searches for the first layer (L1) tables of the target map tables, which are stored in the first layer (L1) cache. Since the first layer (L1) tables are fully cached, first layer (L1) table entries corresponding to the target logical addresses are always searched for in the first layer (L1) cache.

The memory controller 120 may determine physical addresses corresponding to the target logical addresses, by searching for map entries corresponding to the target logical addresses in the map cache, based on the information of the searched first layer (L1) table entries.

If a target map table is the first map table, similar to the example of FIG. 8, the memory controller 120 may search for mapping information for the target logical address among map cache entries which are some of the map entries of the first map table.

Similar to the example of FIG. 7, the map entries of the first map table may be loaded to the map cache by the unit of the first map read segment RSEG. Thus, the memory controller 120 may search for the mapping information for the target logical address, among map cache entries which are loaded by the unit of the first map read segment RSEG.

If a target map table is the second map table, similar to the example of FIG. 9, the memory controller 120 may search for mapping information for the target logical address among map cache entries which are some of the map entries of the second map table.

Similar to the example of FIG. 7, the map entries of the second map table may be loaded to the map cache by the unit of the second map read segment RSEG'. Thus, the memory controller 120 may search for the mapping information for the target logical address, among map cache entries which are loaded by the unit of the second map read segment RSEG'.

Figure 14:
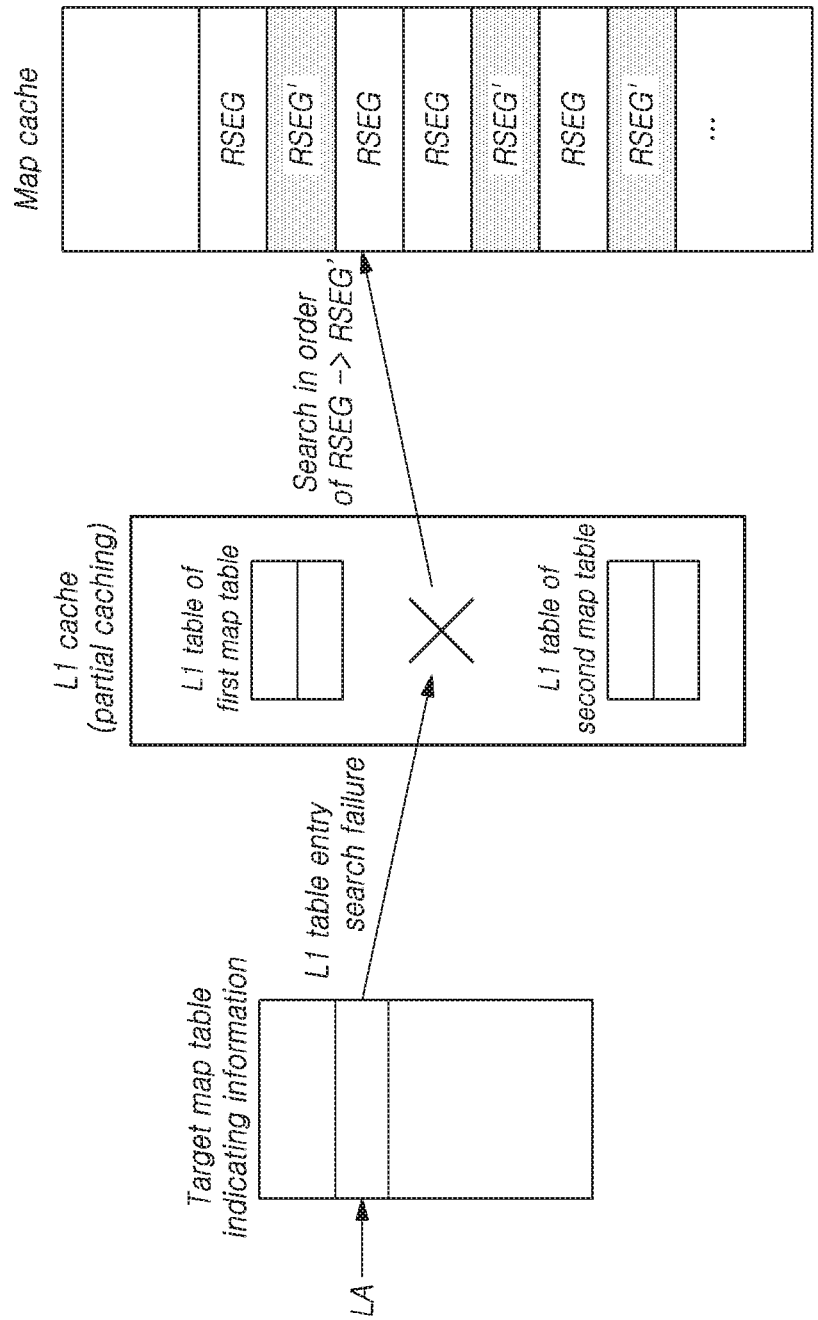
FIG. 14 is a diagram illustrating an example in which mapping information is searched for in the map cache, in the case where the first layer (L1) tables included in the map tables of FIG. 12 are partially cached.

FIG. 14 is a diagram illustrating an example in which mapping information is searched for in the map cache, in the case where the first layer (L1) tables included in the map tables of FIG. 12 are partially cached.

That the first layer (L1) tables are partially cached means that only a part of the first layer (L1) tables included in the respective map tables are cached. That is to say, a first layer (L1) table entry corresponding to a target logical address LA may not exist in the first layer (L1) cache. In this case, the first layer (L1) table entry corresponding to the target logical address may not be searched for.

In the case where the first layer (L1) table entry corresponding to the target logical address does not exist in the first layer (L1) cache, the memory controller 120 cannot delimit map entries which are likely to correspond to the target logical address, by using the information of first layer (L1) table entries. Therefore, the memory controller 120 may search for a map entry corresponding to the target logical address, among the entire map cache entries loaded to the map cache.

In other words, the memory controller 120 may search for the mapping information of a target physical address corresponding to the target logical address, in map cache entries including some of the map entries of the first map table and map cache entries including some of the map entries of the second map table.

The memory controller 120 may search map cache entries of the first map table with a higher priority than the map cache entries of the second map table.

Mapping information for a logical address is stored first in the first map table, and in the case where a specific condition is satisfied (e.g., N map entries corresponding to N consecutive physical address regions, respectively, exist), the mapping information for the corresponding logical address is stored in the second map table.

Thus, because there is a high probability that a map entry indicating the mapping information corresponding to the logical address exists in the first map table, the memory controller 120 may search first the map cache entries including some of the map entries of the first map table.

In the case where a first layer (L1) table entry is evicted from the first layer (L1) cache, the memory controller 120 determines whether to evict it, for all of map cache entries including some of the map entries of the first map table and map cache entries including some of the map entries of the second map table.

Figure 15:
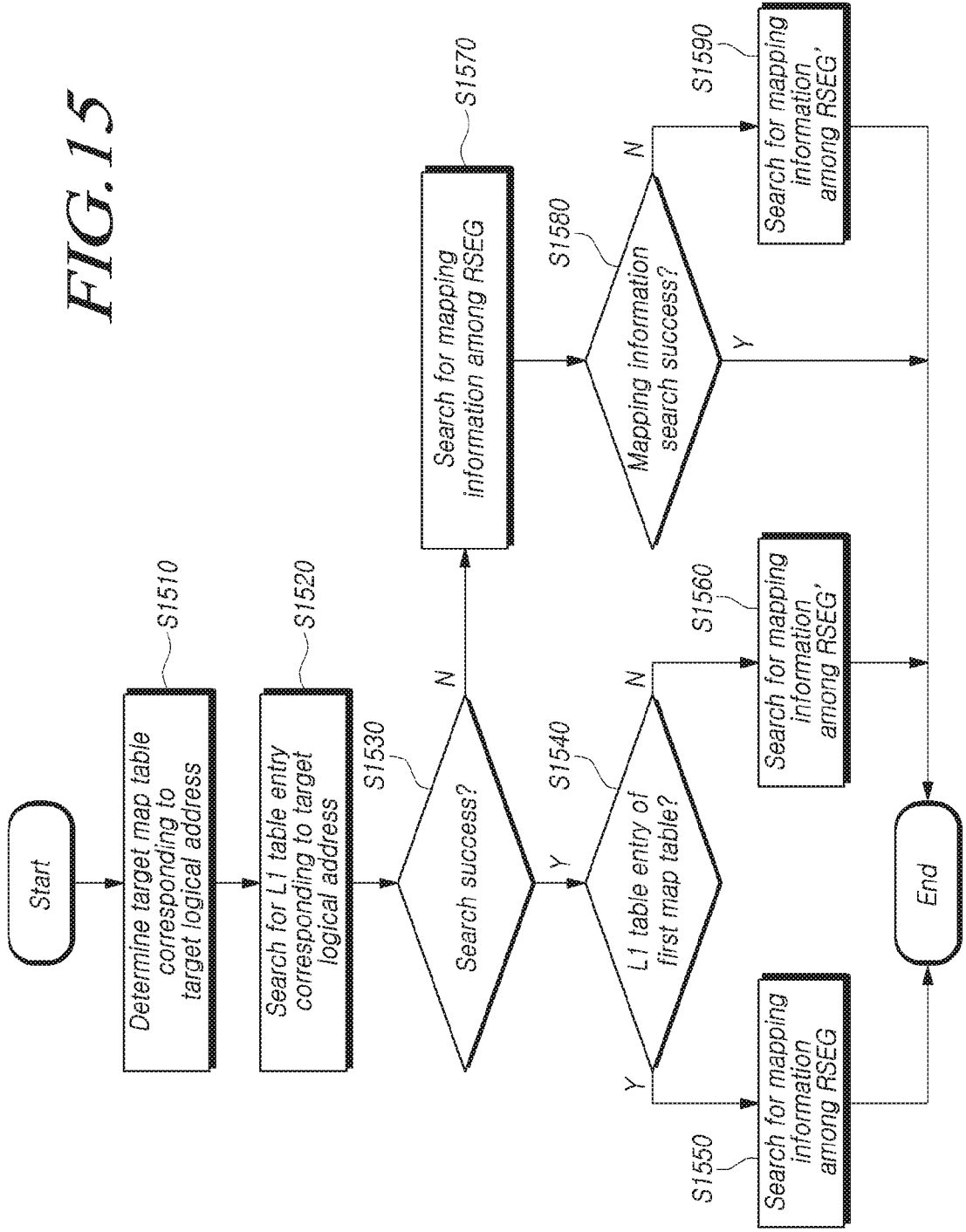
FIG. 15 is a flow chart of a method for performing an operation, such as that described with reference to FIGS. 13 and 14.

FIG. 15 is a flow chart of a method for performing the operation described above with reference to FIGS. 13 and 14.

Referring to FIG. 15, the memory controller 120 may determine a target map table corresponding to a target logical address, based on target map table indicating information (S1510).

The memory controller 120 searches for a first layer (L1) table entry corresponding to the target logical address in the first layer (L1) cache (S1520).

If the first layer (L1) table entry corresponding to the target logical address is found in the first layer (L1) cache (S1530-Y), the memory controller 120 determines whether the found first layer (L1) table entry is a first layer (L1) table entry of the first map table, that is, whether the found first layer (L1) table entry is a first layer (L1) table entry included in the first layer (L1) table of the first map table (S1540).

If the found first layer (L1) table entry is a first layer (L1) table entry of the first map table (S1540-Y), the memory controller 120 searches for mapping information for the target logical address, in map cache entries which are some of the map entries of the first map table (S1550).

If the found first layer (L1) table entry is not a first layer (L1) table entry of the first map table (S1540-N), the memory controller 120 searches for mapping information for the target logical address, in map cache entries which are some of the map entries of the second map table (S1560).

If the first layer (L1) table entry corresponding to the target logical address is not found in the first layer (L1) cache (S1530-N), the memory controller 120 searches for mapping information corresponding to the target logical address, in map cache entries including some of the map entries of the first map table and map cache entries including some of the map entries of the second map table, among the map cache entries included in the map cache.

As described above with reference to FIG. 14, the memory controller 120 may search the map cache entries of the first map table with a higher priority than the map cache entries of the second map table, among the map cache entries included in the map cache.

Namely, the memory controller 120 searches for the mapping information for the target logical address, in map cache entries which are some of the map entries of the first map table (51570). If the search for the mapping information for the target logical address succeeds (S1580-Y), the memory controller 120 may determine a physical address corresponding to the target logical address based on the searched mapping information.

Conversely, if the search for the mapping information for the target logical address fails (S1580-N), the memory controller 120 searches for the mapping information for the target logical address, in map cache entries which are some of the map entries of the second map table (S1590).

Figure 16:
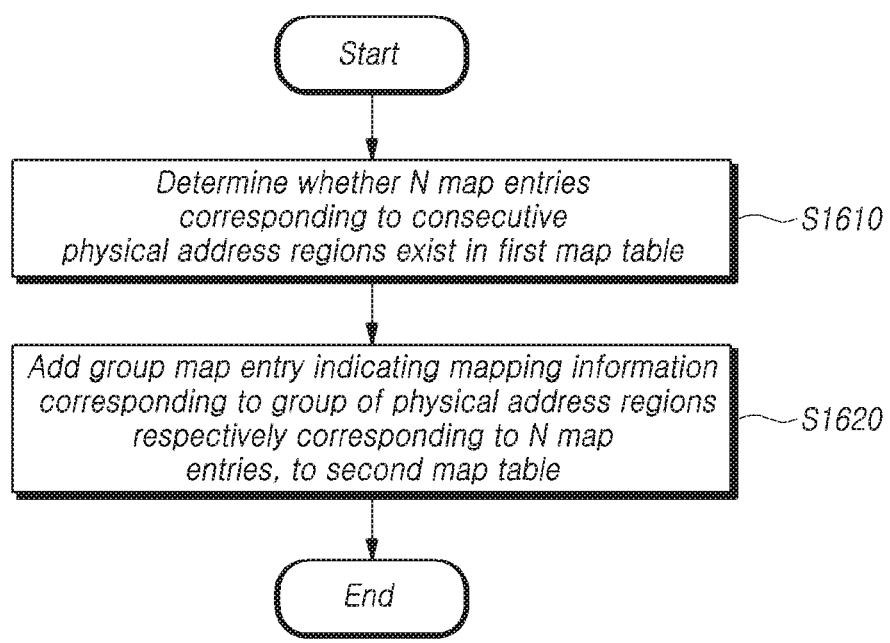
FIG. 16 is a flow chart of a method for operating a memory controller in accordance with an embodiment of the disclosure.

FIG. 16 is a flow chart of a method for operating the memory controller 120 in accordance with an embodiment of the disclosure.

Hereinafter, an example is described in which the method of FIG. 16 is performed by the memory controller 120 described above with reference to FIGS. 1 to 15. For example, the flow described in connection with FIG. 16 may be a generalized version or variation of the embodiment of FIG. 6.

Referring to FIG. 16, the method for operating the memory controller 120 which controls the memory device 110 may include checking whether N map entries corresponding to consecutive physical address regions exist among map entries included in a first map table (S1610), where N is a natural number of 2 or greater.

The memory device 110 may include a plurality of memory blocks, and may store a plurality of map tables including a plurality of map entries which indicate mapping information between logical addresses and physical addresses.

The plurality of map tables may include a first map table and a second map table. The size of a physical address region corresponding to one map entry included in the second map table may be N times the size of a physical address region corresponding to one map entry included in the first map table.

The method for operating the memory controller 120 may include, when N map entries corresponding to consecutive physical address regions exist among the map entries included in the first map table, adding a group map entry indicating mapping information corresponding to the group of the physical address regions corresponding to the N map entries, respectively, to the second map table (S1620).

The method for operating the memory controller 120 may further include erasing the above-described N map entries from the first map table.

The operations of the memory controller 120 described above with reference to FIGS. 3 to 16 may be performed by the control circuit 123 included in the memory controller 120.

Figure 17:
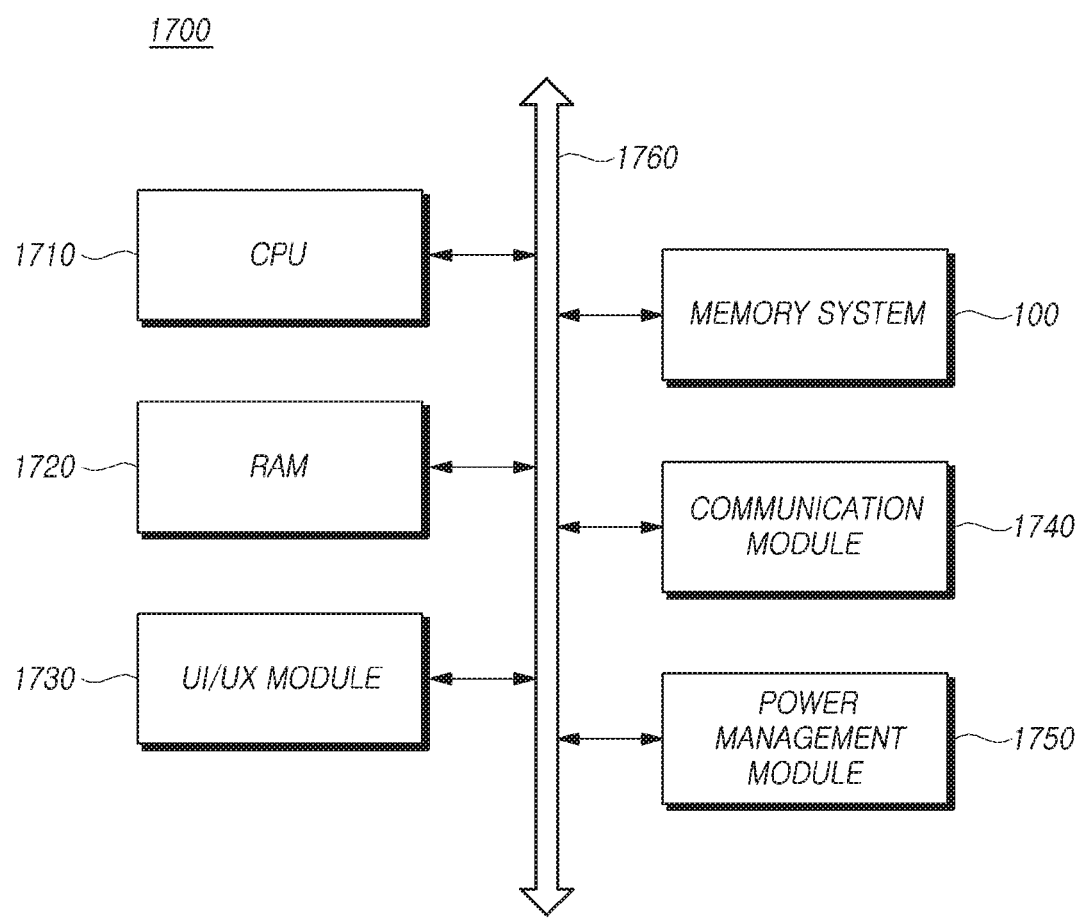
FIG. 17 is a block diagram schematically illustrating an example of a computing system in accordance with an embodiment of the disclosure.

FIG. 17 is a block diagram schematically illustrating an example of a computing system in accordance with an embodiment of the disclosure.

Referring to FIG. 17, a computing system 1700 may include a memory system 100 which is electrically coupled to a system bus 1760, a central processing unit (CPU) 1710 which controls general operations of the computing system 1700, a RAM 1720 which stores data and information related to the operations of the computing system 1700, a UI/UX (user interface/user experience) module 1730 for providing user environment, a communication module 1740 for communicating with an external device in a wired and/or wireless manner, and a power management module 1750 which manages power used by the computing system 1700.

The computing system 1700 may include a PC (personal computer), a mobile device, e.g., a smartphone or a tablet, or any of various electronic devices.

The computing system 1700 may further include a battery for supplying an operating voltage, and may further include an application chipset, a graphic-related module, a camera image processor (CIS), a DRAM, and other components, as those skilled in the art would understand.

The memory system 100 may include not only a device which stores data in a magnetic disk, such as a hard disk drive (HDD), but also a device which stores data in a nonvolatile memory, such as a solid state drive (SDD), a universal flash storage (UFS) device or an embedded MMC (eMMC) device.

The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and/or an FRAM (ferroelectric RAM).

In addition, the memory system 100 may be realized as, or mounted in, any of various types of storage devices. For instance, the memory system 100 may be mounted to an IoT device or a small-sized home appliance which need to minimize the amount of memory used.

As is apparent from the above description, embodiments of the disclosure may provide a memory system, a memory controller and an operating method thereof, capable of reducing storage capacity for storing map tables.

Also, embodiments of the disclosure may provide a memory system, a memory controller and an operating method thereof, capable of increasing the size of an address region to be cached in a map cache.

Further, embodiments of the disclosure may provide a memory system, a memory controller and an operating method thereof, capable of efficiently caching mapping information between a logical address and a physical address and thereby improving read/program performance.

Although various embodiments of the disclosure have been illustrated and described, those skilled in the art will appreciate in light of the present disclosure that various modifications, additions and substitutions are possible, without departing from the scope and spirit of the disclosure. Therefore, the embodiments disclosed herein should be considered in a descriptive sense only and not as limiting the I scope of the present invention. The present invention is defined by the appended claims and encompasses all equivalents falling within the scope of the appended claims.

What is claimed is:

1. A memory system comprising:
a memory device configured to store a plurality of map tables, each including a plurality of map entries, each indicating mapping information between one or more logical addresses and one or more physical addresses; and
a memory controller configured to control the memory device,
wherein the plurality of map tables include a first map table and a second map table,
wherein a size of a physical address region corresponding to each of a plurality of map entries in the second map table is N times a size of a physical address region corresponding to each of a plurality of map entries in the first map table, where N is a natural number of 2 or greater, and
wherein, in a case where N map entries respectively corresponding to N consecutive physical address regions exist among the plurality of map entries in the first map table, the memory controller adds a group map entry indicating mapping information corresponding to a group of the N consecutive physical address regions to the second map table.

2. The memory system according to claim 1, wherein the memory controller erases the N map entries from the first map table when the group map entry is added to the second map table.

3. The memory system according to claim 1, wherein the memory controller is further configured to:
update the plurality of map entries in the first map table, by a unit of a first map write segment; and
update the plurality of map entries in the second map table, by a unit of a second map write segment different from the first map write segment.

4. The memory system according to claim 1, wherein the memory controller is further configured to:
load a map cache entry including at least some of the plurality of map entries included in any one map table among the plurality of map tables, to a map cache,
load at least some of the plurality of map entries included in the first map table, to the map cache, by a unit of a first map read segment, and
load at least some of the plurality of map entries included in the second map table, to the map cache, by a unit of a second map read segment different from the first map read segment.

5. The memory system according to claim 4, wherein the memory controller is further configured to identify mapping information of a target physical address corresponding to a target logical address in the map cache by
determining a target map table corresponding to the target logical address among the plurality of map tables, based on target map table indicating information indicating a map table corresponding to the target logical address, and
searching for the mapping information of the target physical address in map cache entries including some map entries of the target map table, among map cache entries in the map cache.

6. The memory system according to claim 5, wherein the target map table indicating information is stored as a bitmap corresponding to the target logical address.

7. The memory system according to claim 5, wherein the memory controller is further configured to determine the target physical address corresponding to the target logical address, based on an offset between the target logical address and a start logical address in the mapping information corresponding to the target logical address.

8. The memory system according to claim 1, wherein
each of the plurality of map tables comprises a first layer table including a plurality of first layer table entries and one or more second layer tables, and
each of the one or more second layer tables includes some of the plurality of map entries, and corresponds to one of the plurality of first layer table entries.

9. The memory system according to claim 8, wherein the memory controller caches all first layer table entries in the first layer table, in a first layer cache, for each of the plurality of map tables.

10. The memory system according to claim 8, wherein the memory controller is further configured to when mapping information of a target physical address corresponding to a target logical address is included in the first map table and a first layer table entry corresponding to a second layer table including the mapping information is not cached in the first layer cache,
search for the mapping information in map cache entries including some of the map entries of the first map table and map cache entries including some of the map entries of the second map table, among the map cache entries in the map cache.

11. The memory system according to claim 10, wherein, the memory controller searches the map cache entries including some of the map entries of the first map table with a higher priority than the map cache entries including some of the map entries of the second map table, among the map cache entries in the map cache.

12. A memory controller comprising:
a memory interface configured to communicate with a memory device which stores a plurality of map tables, each including a plurality of map entries, each indicating mapping information between one or more logical addresses and one or more physical addresses; and
a control circuit configured to control the memory device,
wherein the plurality of map tables include a first map table and a second map table,
wherein a size of a physical address region corresponding to each of a plurality of map entries in the second map table is N times a size of a physical address region corresponding to each of a plurality of map entries in the first map table, where N is a natural number of 2 or greater, and wherein, in a case where N map entries corresponding to N consecutive physical address regions exist among the plurality of map entries in the first map table, the control circuit adds a group map entry indicating mapping information corresponding to a group of the N consecutive physical address regions to the second map table.

13. The memory controller according to claim 12, wherein the control circuit erases the N map entries from the first map table when the group map entry is added to the second map table.

14. The memory controller according to claim 12, wherein the control circuit is further configured to:
update the plurality of map entries included in the first map table, by a unit of a first map write segment; and
update the plurality of map entries included in the second map table, by a unit of a second map write segment different from the first map write segment.

15. The memory controller according to claim 12, wherein
the control circuit comprises a working memory which stores a map cache which caches some of the map entries included in any one among the plurality of map tables, and
the control circuit is further configured to:
load at least some of the plurality of map entries included in any one map table among the plurality of map tables to the map cache; and
identify mapping information of a target physical address corresponding to a target logical address in the map cache by:
determining a target map table corresponding to the target logical address among the plurality of map tables, based on a target map table indicating information indicating a map table corresponding to the target logical address, and
searching for the mapping information of the target physical address in map cache entries including some map entries of the target map table, among map cache entries of the map cache.

16. The memory controller according to claim 15, wherein the control circuit is further configured to determine the target physical address corresponding to the target logical address, based on an offset between the target logical address and a start logical address in the mapping information corresponding to the target logical address.

17. The memory controller according to claim 12, wherein
each of the plurality of map tables comprises a first layer table including a plurality of first layer table entries and one or more second layer tables, and
each of the one or more second layer tables includes a part of the plurality of map entries, and corresponds to any one of the plurality of first layer table entries.

18. The memory controller according to claim 17, wherein the control circuit caches all first layer table entries included in the first layer table, in a first layer cache, for each of the plurality of map tables.

19. The memory controller according to claim 17, wherein the control circuit is further configured to, when mapping information of a target physical address corresponding to a target logical address is included in the first map table and a first layer table entry corresponding to a second layer table including the mapping information is not cached in the first layer cache,
search for the mapping information in map cache entries including some of the map entries of the first map table and map cache entries including some of the map entries of the second map table, among the map cache entries in the map cache.

* * * * *